United States Patent
Li et al.

(10) Patent No.: US 6,526,103 B1
(45) Date of Patent: Feb. 25, 2003

(54) MULTI-STAGE RECEIVER

(75) Inventors: Bin Li, Ottawa (CA); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,014

(22) Filed: Dec. 23, 1998

(51) Int. Cl.[7] .............................. H04L 27/06; H04L 1/00
(52) U.S. Cl. ...................................... 375/316; 375/346
(58) Field of Search ................................ 375/316, 349, 375/130, 340, 147, 346; 370/342, 335, 329, 331

(56) References Cited

U.S. PATENT DOCUMENTS

| | | | |
|---|---|---|---|
| 4,901,307 A | 2/1990 | Gilhousen et al. | 370/18 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,329,547 A * | 7/1994 | Ling | 370/342 |
| 5,442,627 A | 8/1995 | Viterbi et al. | 370/22 |
| 5,822,359 A * | 10/1998 | Bruckert et al. | 370/209 |
| 5,970,058 A * | 10/1999 | DeClerk et al. | 370/329 |
| 6,161,209 A * | 12/2000 | Moher | 375/262 |
| 6,308,072 B1 * | 10/2001 | Labedz et al. | 455/446 |

OTHER PUBLICATIONS

Chang et al., "Comparison of Two Convolutional Orthogonal Coding Techniques for CDMA Radio Communications Systems", IEEE Transactions on Communications, vol. 43, No. 6, Jun. 1995, pp. 2024–2037.

* cited by examiner

Primary Examiner—Chi Pham
Assistant Examiner—Khai Tran

(57) ABSTRACT

A detector for detecting a traffic signal from a first demodulated signal is provided. The detector comprises a first stage for receiving the first demodulated signal and generating a first estimate of the traffic signal and a second stage connected to the first stage. The second stage receives the first demodulated signal and the first estimate of the traffic signal and generates a second estimate of the traffic signal from the first demodulated signal and the first estimate of the traffic signal. A method of detecting a traffic signal from a first demodulated signal is provided. The method comprises the steps of (a) generating an estimate of the traffic signal from the first demodulated signal using a first stage and (b) generating another estimate of the traffic signal from the first demodulated signal and the estimate of the traffic signal obtained from step (a) using a second stage.

42 Claims, 9 Drawing Sheets

MULTI-STAGE RECEIVER

FIELD OF THE INVENTION

The present invention relates to receiving signals in a radio communications systems and particularly, but not exclusively, in a spread-spectrum communications system.

BACKGROUND OF THE INVENTION

In a typical wireless communication system, a plurality of mobile stations is accommodated. Typically, more than one mobile station utilizes the wireless communications system at any given time. Such a communications system is sometimes called a multiple access communications system.

Radio frequency (RF) signals are used in multiple access communication systems to carry traffic between the mobile stations and base stations. With the enormous and ever increasing popularity of multiple access communications systems (e.g. cellular phone communications systems), the RF spectrum has become a vary scarce resource. As a result, it is more and more important for service providers of multiple access communication systems to efficiently use the RF spectrum allocated to them and to maximize the capacity of the multiple access communications systems to carry traffic.

Many different techniques which allow multiple mobile stations to access a multiple access communications system simultaneously have been utilized such as time division multiple access (TDMA), frequency division multiple access (FDMA) and code division multiple access (CDMA). CDMA utilizes spread-spectrum modulation techniques which have certain advantages over TDMA and FDMA. Many new communications systems employed today utilize CDMA. The use of CDMA in a multiple access communications system is disclosed in U.S. Pat. No. 4,901,307 entitled "Spread-Spectrum Multiple Access Communications System Using Satellite or Terrestrial Repeaters" and issued to Qualcomm Incorporated on Feb. 13, 1993. This patent is incorporated by reference herein in its entirety.

A typical multiple access communications system which utilizes CDMA (a "CDMA Communications System") has not only a plurality of mobile stations but also a plurality of base stations with which the mobile stations communicate. In addition, a typical CDMA communications system has at least one forward CDMA channel and at least one reverse CDMA channel. Each forward CDMA channel and each reverse CDMA channel is assigned a unique frequency band, none of which overlap with each other. Typically, there is a guard frequency band between the frequency band(s) used by the forward channel(s) and the frequency band(s) used by the reverse channel(s).

Communications from the base stations to the mobile stations are carried in the forward CDMA channel(s). Each forward CDMA channel is composed of a plurality of code channels. The code channels share the frequency band assigned to the respective forward CDMA channel using spread-spectrum modulation techniques. Each mobile station is associated with a unique code channel. (i.e. communications from the base stations to the mobile stations are carried in the respective code channels).

Similarly, communications from the mobile stations to the base stations are carried in the reverse CDMA channel(s). Each reverse CDMA channel is composed of a plurality of code channels, typically called access channels and reverse traffic channels. The code channels share the frequency band assigned to the respective reverse CDMA channel using spread spectrum modulation techniques. Each mobile station is associated with a unique reverse traffic channel. (i.e. communications from the mobile stations to the base stations are carried in the respective reverse traffic channels). The access channels are typically used to page or notify the base stations of outgoing calls.

In CDMA communications systems defined by ANSI Standard J-STD-008 or TIA/EIA Standard IS-95A, which are incorporated by reference herein, each frequency band utilized by the forward CDMA channel(s) and the reverse CDMA channel(s) is 1.23 MHZ wide. In addition, each forward CDMA channel and each reverse CDMA channel is further divided into 64 code channels.

In a CDMA communications system, the base stations may be satellites circulating the globe or stations located on the ground ("terrestrial base stations") or both. At the UHF or higher frequency bands commonly used by CDMA communications systems, a signal from a mobile station commonly arrives at a base station via a plurality of different paths. (i.e. a plurality of signals are commonly received at the base station for each signal sent from the mobile station). Similarly, a signal from a base station directed to a mobile station commonly arrives at the mobile station via a plurality of different paths.

The time it takes (typically called a path delay) for a signal to arrive at its intended destination is commonly different for each path. Moreover, significant phase differences between the signals travelling on different paths may occur especially at the UHF or higher frequency bands. In other words, signals may arrive at a base station from a mobile station (or a mobile station from a base station) from many different directions or paths, each with a different path delay and phase. When signals are received at each base station and each mobile station, destructive summation of the signals may occur with on occasion deep fading. Such multipath fading is common at the UHF or higher frequency bands.

Multipath fading on the signals between the satellites and the mobile stations is not usually as severe as the multipath fading on the signals between the terrestrial base stations and the mobile stations. Since the satellites are normally located in the geosynchronous earth orbit, the distances between mobile stations and any given satellite are relatively the same. In addition, if a mobile stations changes location, the distance between the mobile station and a satellite does not change significantly. In contrast, the distances between the mobile stations and the terrestrial base stations can vary quite significantly. One mobile station may be a few hundred feet away from a terrestrial base station and another mobile station may be miles away from the same base station. In addition, if a mobile station changes position, the distance between the mobile station and the terrestrial base station may change significantly. Consequently, the change in the position of the mobile station may change the path delays and phases of all of the signals carried on the respective paths between the mobile station and the terrestrial base station.

In light of the above, signals between the satellites and the mobile stations typically experience fading that is characterized as Rician Fading. In contrast, signals between the terrestrial base stations and the mobile stations typically experience more severe fading that is characterized as Rayleigh Fading. The Rayleigh fading is due, in part, by the signals being reflected from a plurality of objects (e.g. buildings) between the mobile stations and the base stations.

Since a CDMA communications system utilizes a wide band signal in each forward CDMA channel and in each reverse CDMA channel, multipath fading typically only affects a small part of each wide band signal. In other words, CDMA by inherent nature uses a form of frequency diversity to mitigate the deleterious affects of multipath fading.

In addition to frequency diversity, CDMA communications systems commonly use time diversity and space (or path) diversity to mitigate the deleterious affects of multipath fading. Time diversity is commonly employed through the use of repetition, time interleaving and error detection and correction decoding schemes. Space diversity is commonly employed in the reverse CDMA channel(s) through the use simultaneous communication links from each mobile station to a base station employing a plurality of antennas. Each antenna services one of the simultaneous communication links. Space diversity is also commonly employed in the forward CDMA channel(s) and in the reverse CDMA channel(s) by exploiting the unique characteristics of the spread-spectrum signals used by CDMA communications systems.

Many CDMA communications systems, such as CDMA communications systems defined by IS-95A Standard ("IS-95 CDMA Communications Systems"), modulate the traffic carried in each code channel using high speed pseudo noise (PN) modulation techniques at a PN chip rate. Each code channel within a reverse CDMA channel is assigned and modulated with a unique PN code to generate PN sequences (containing the traffic). The high speed PN modulation allows many different paths to be separated provided the difference in path delays exceed the inverse of the PN chip rate (i.e. 1/PN rate), typically called a PN chip duration.

However, the PN codes and the resulting sequences are not orthogonal. For short time intervals (e.g. an information bit), the cross correlations between different PN codes and the cross correlations between different PN sequences are random with a binomial distribution. Consequently, the traffic carried in each code channel typically interferes with the traffic carried in other code channels. To reduce the mutual interference and allow higher system capacity, many CDMA communications systems also modulate the traffic carried in each code channel with orthogonal binary sequences, such as Walsh codes, from a set of a fixed number of mutually orthogonal binary sequences. Each orthogonal binary sequence has a corresponding index symbol. For example, in a CDMA communications system, defined by the IS-95A standard, 64 different Walsh codes are used. Consequently, every six bits of data traffic corresponds to one of the index symbols and are mapped to one of the 64 Walsh codes. The use of Walsh codes reduces the mutual interference and increases the system capacity to carry traffic.

The base stations typically send in each forward CDMA channel, one or more pilot signals which are used by receivers in the mobile stations to coherently demodulate the traffic carried in the forward CDMA channels. The pilot signals provide channel information relating to amplitude changes (i.e. fading) and phase changes. However, due to power considerations, the mobile stations do not typically send a pilot signal to the base stations. (e.g. in IS-95A CDMA communications systems, the mobile stations do not send pilot signals to the base stations). Consequently, receivers at the base stations must typically use non-coherent demodulation techniques to demodulate or detect the traffic sent in the reverse traffic channels within each reverse CDMA channel).

Since, by its inherent nature, it is more difficult to demodulate traffic using non-coherent demodulation techniques than using coherent demodulation techniques, the capacity of many CDMA communications systems to handle traffic is limited by the ability of the receivers at the base station to detect error free the traffic carried in the reverse traffic channels (within each reverse CDMA channel) using non-coherent demodulation techniques. Consequently, the capacity of many CDMA communications systems is limited by the performance of the receivers used at the base stations.

Each base station has at least one receiver with at least one antenna. Since each receiver typically services only one mobile station at a time, each base station typically has a plurality of receivers, one for each mobile station to be serviced simultaneously. Each receiver at the base station typically has a receiver section, a detector section and a decoder section.

A conventional approach used to maximize the performance of the receivers at the base stations is to optimize separately the detector section and the decoder section of each receiver.

With many CDMA communications systems, the mobile stations first encode the data bits of the traffic to data symbols at a fixed encoding rate using an encoding algorithm which facilitates subsequent maximum likelihood decoding of the data symbols into data bits by a decoder in the decoder section. Furthermore, the mobile stations also typically interleave the data symbols using an interleaver to generate interleaved data symbols. The interleaving of the data symbols helps reduce the deleterious effects of multipath fading and improve the performance of the decoder section.

The mobile stations then map (or encode) the interleaved data symbols (containing the traffic) into orthogonal codes from a set of mutually orthogonal codes, such as Walsh codes. The use of orthogonal codes facilitates the detection of each data symbol carried in respective code channel by the detector and decoder sections of the receiver at the base station.

For each antenna at a base station, a single maxima receiver or a dual maxima receiver is commonly used. Each single maxima receiver and each dual maxima receiver commonly uses a rake receiver design. Such a design has two or more fingers, each finger receives and detects signals carried on one of the paths.

Referring to FIGS. 2 and 3, a single maxima receiver 300 of the rake receiver design consists of an antenna 310, a receiver section 320, a detector section 330 and a decoder section 340. (Alternatively, more than one antenna 310 may be used for space or path diversity reception). The receiver section 320 is connected to the antenna 310 and to the detector section 330. The decoder section 340 is connected to the demodulator section 330.

The receiver section 320 consists of one receiver subsection. (If more than one antenna 310 is used, multiple receiver subsections would be employed, one for each antenna 310). Each receiver subsection consists of a searcher receiver and three data receivers. More or less than three data receivers can be used. (However, each receiver section must have one searcher receiver and at least one data receiver). For each RF signal sent by the mobile station, the searcher receiver searches the received spread-spectrum RF signals arriving via the various reverse paths at the antenna 310 for the strongest spread-spectrum RF signals associated with the mobile station. The searcher receiver then instructs the data receivers to track and receive the RF signals carried in the reverse paths with the strongest levels. Each data receiver typically receives and tracks a separate RF signal. In particular, each data receiver demodulates the respective spread-spectrum RF signal and translates the respective spread-spectrum RF signal from the RF frequency to a processed received signal at a lower frequency. Furthermore, each data receiver samples at the PN chip rate (e.g. 1.2288 msamples/sec) the respective processed received signal to generate respective data samples 325A, 325B and 325C for the detector section 330 of the receiver 300.

The detector section 330 of the single maxima receiver 300 consists of three detector subsections, a first subsection 400A, a second subsection 400B and a third subsection 400C. Each subsection 400A–C is associated with one of the data receivers in the receiver section 320. The combination of each data receiver with its corresponding subsection 400A–C is commonly called a finger of the single maxima receiver 300 (using rake receiver terminology). If more data receivers are employed (or if more receiver sub-sections are employed), then a corresponding additional number of subsections would be employed.

The detector subsection 400A consists of a demodulator 410, a Walsh transformer circuitry 420 and squaring and summing circuitry 430. The Walsh transformer circuitry 420 is connected to the demodulator 410 and to the squaring and summing circuitry 430. The detector subsection 400A typically demodulates groups of samples 325A of the processed received signal into two groups of samples of subsignals using a demodulator—one group of samples 412 of an in phase signal and one group of samples 414 of a quadrature phase signal. The two groups of samples 412, 414 of subsignals are transformed into a block of complex transformer output signals 425 using the Walsh transformer circuitry 420. Typically, the Walsh transformer circuitry 420 consists of two fast Hadamard Transformers (FHT) which transform each group of samples 412 of the in phase signal and each group of samples 414 of the quadrature phase signal into two separate blocks of transformer output signals. The two blocks of transformer output signals are commonly represented as one block of complex transformer output signals 425 (i.e. using complex mathematics). A block of complex transformer output signals 425 may be called a transformer block.

Since Walsh codes are typically used in a CDMA communications system, a block of complex transformer output signals 425 is sometimes called a Walsh block. Each row of the block of complex transformer output signals 425 is a complex transformer output signal 425 (comprising one row of transformer output signals associated with the in phase signal and a corresponding row of transformer output signals associated with the quadrature phase signal).

Each block of complex transformer output signals 425 is carried to the squaring and summing circuitry 430 which converts each block of complex transformer output signals 425 into groups of energy values 445A (or decision values). Each energy value 445A within the group of energy values 445A associated with a particular group of samples 325A of the processed received signal represents a measure of confidence that the group of samples 325A of the processed received signal corresponds to a particular orthogonal code with a corresponding index value. Consequently, each row of the block of complex transformer output signals 425 (i.e. each transformer output signal) corresponds to a measure of confidence that a particular group of sampled signals 325A corresponds to a particular orthogonal code from within the set of mutually orthogonal codes. Since each orthogonal code from the set of mutually orthogonal codes has a corresponding index symbol, each energy value 445A has an associated index symbol.

Similarly, the other fingers generate groups of energy values 445B and 445C associated with groups of samples 325B and 325C respectively.

The detector subsections 400A–C are sometimes called correlator detectors since they correlate samples of the received signal with one of the orthogonal codes (e.g. one of the Walsh codes).

The energy values 445A–C from each finger is fed into the decoder section 340. The decoder section 340 of the receiver 300 attempts to recover the data bits originally sent. The decoder section 340 consists of a summer 500, a single-maxima metric generator 540, a deinterleaver 550 and a decoder 560. The summer 500 is connected to the squaring and summing circuitry 430 is each finger and to the single maxima metric generator 540. The deinterleaver 550 is connected to the single maxima metric generator 540 and to the decoder 560.

Using the summer 500 in the decoder section 340, each group of energy values 445A from the first detector subsection 400A is directly added with other groups of energy values 445B, 445C from the other detector subsections 400B–C in the other fingers according to their associated orthogonal code (or index symbol) to create a group of combined energy values 505. The combined energy value 505 for each index symbol is fed into the single maxima metric generator 540.

Referring in particular to FIG. 3, the single maxima metric generator 540 consists of selector 515, an index mapper 520, a metric computor 525 and a multiplier 530. The selector 515 is connected to the summer 500, to the index mapper 520 and to the metric computor 525. The multiplier 530 is connected to the index mapper 520 and to the metric computor 525. The selector 515 selects the largest combined energy value 518 within each group of combined energy values 505. The largest combined energy value 505 represents the largest measure of confidence that the groups of samples 325A–C of the processed signal corresponds to one of the orthogonal codes (sometimes called the most likely orthogonal code sent by the mobile station). (i.e. Since each orthogonal code has a corresponding index symbol, the largest combined energy value 518 represents the largest measure of confidence that the groups of samples 325A–C of the received signal corresponds to one of the index symbols). The selector 515 also selects the symbol 517 (or index symbol) associated with the largest combined energy value 518 (i.e. the most likely orthogonal code). The-index symbol 517 selected is carried to the index mapper 520 which maps the index symbol 517 into a plurality of "1" and "–1" soft decision bits 522. The largest combined energy value 518 is carried to the metric computor 525 which generates a scaling factor 527. The multiplier 530 then scales the soft decision bits 522 by the scaling factor 527 to produce soft decision data 545. The first bit in the soft decision data 545 represents a measure of confidence of the value of the first digit of index symbol (corresponding to the most likely orthogonal code). In other words, the first bit in the soft decision data 545 represents a measure of confidence of the value of the first digit of the interleaved data symbol actually sent. The second bit in the soft decision data 545 represents a measure of confidence of the value of the second digit of the index symbol (corresponding to the most likely orthogonal code) or the interleaved data symbol actually sent, etc.

The soft decision data 545 is carried to the deinterleaver 550. The deinterleaver 550 deinterleaves the soft decision data 545 generating deinterleaved soft decision data 555.

The deinterleaved soft decision data 555 is then carried to a decoder 560 (typically a viterbi decoder) which decodes the deinterleaved soft decision data 555 into estimated digital traffic data bits 565.

Sometimes the base stations use simple single maxima receivers that do not use the rake receiver design. Such receivers only have one finger.

The method used by a simple single maxima receiver to generate the largest combined energy value for the $k^{th}$ block of complex transformer output signals r can be represented mathematically fairly easily as follows:

$$\text{largest energy value}_k = \max\{|r_{k,1}|^2, |r_{k,2}|^2 \ldots |r_{k,n}|^2\}$$

where n is the total number of orthogonal codes used.

A single maximum receiver is disclosed in U.S. Pat. No. 5,109,390 entitled "Diversity Receiver in CDMA Cellular Telephone System" and issued to the Qualcomm Incorporated on Apr. 28, 1992. This patent is incorporated by reference herein in its entirety.

To increase the system capacity, some CDMA communications systems use receivers typically called dual-maxima receivers. Dual-maxima receivers have improved bit error performance than single-maxima receivers. The dual-maxima receiver may or may not use a rake receiver design.

Referring to FIG. 4, a dual maxima receiver 600 of the rake receiver design consists of an antenna 310', a receiver section 320', a detector section 330' and a decoder section 605. The antenna 310', the receiver section 320', the detector section 330' are identical to the antenna 310, the receiver section 320 and the detector section 330 found in the single maxima receiver 300 and operate in exactly the same way. The detector section 330' has three detector subsection 400A', 400B' and 400C' which are identical to the detector subsection 400A, 400B and 400C found in the single maxima receiver 300 and operate in exactly the same way.

However, the dual maxima receiver has a different decoder section 605. The decoder section 605 consists of a summer 500', a dual maxima metric generator 610, a deinterleaver 550' and a decoder 560'. The summer 500', the deinterleaver 550' and the decoder 560' are identical to the summer 500, the deinterleaver 550 and the decoder 560 found in the single maxima receiver 300 and operate in exactly the same way. However, the single maxima metric generator 540 found in the single maxima receiver 300 is replaced with the dual-maxima metric generator 610. The summer 500' is connected to each detector subsection 400A'–C' in the detector section 330' and to the dual maxima metric generator 610. The deinterleaver 550' is connected to the dual maxima metric generator 610 and to the decoder 560'.

The receiver section 320' has a searcher receiver and three data receivers. The searcher receiver instructs the data receivers to track and receive the strongest spread-spectrum RF signals associated with the mobile station. Each data receivers receives a separate RF signal. In particular, each receiver demodulates the RF signal and translates the RF signal to a processed received signal. Each data receiver in the receiver section 320' generates groups of samples 325A', 325B' and 325C' respectively of the respective processed received signal for each respective detector subsection 400A', 400B' and 400C'.

Referring in particular to the first finger, the first detector subsection 400A' consists of a demodulator 410', Walsh transformer circuitry 420' and squaring and summing circuitry 430'. The Walsh transformer circuitry 420' is connected to the demodulator 410' and to the squaring and summing circuitry 430'. The demodulator 410' is connected to the receiver section 320'. The demodulator 410', the Walsh transformer circuitry 420' and the squaring and summing circuitry 430' are identical to the demodulator 410, the Walsh transformer circuitry 420 and the squaring and summing circuitry 430 found in the single maxima receiver 300 shown in FIG. 2 and operate in exactly the same way.

In particular, groups of data samples 325A' are carried to the demodulator 410'. In the same way as previously described with the single maxima receiver 300, the demodulator 410' and Walsh transformer circuitry 420' transform groups of samples 325A' of the processed received signal into blocks of complex transformer output signals 425', a block of complex transformer output signals for each group of samples 325A' of the processed received signal. Each block of complex transformer output signals 425' is carried to the squaring and summing circuitry 430' which converts each block of complex transformer output signals 425' into a group of energy values 445A' in the same way as previously described for the single maxima receiver 300. Each energy value 445A' within a group of energy values 445A' associated with a group of samples 325A' represents the measure of confidence that the group of samples 325A' of the received signal corresponds to a particular orthogonal code. Since each orthogonal code has a corresponding index symbol, each energy value 445A' within a group of energy values 445A' associated with a group of samples 325A' represents the measure of confidence that the group of samples 325A' of the processed received signal corresponds to a particular index symbol. Similarly, the other fingers generate groups of energy values 445B' and 445C' associated with groups of samples 325B' and 325C' respectively. The groups of energy values 445A'–C' from each finger are carried to the decoder section 605.

Using the summer 500' in the decoder section 605, each group of energy values 445A' is directly added with other groups of energy values 445B'–C' from the other detector subsections 400B'–C' according to their associated orthogonal code (or index symbol) to create a group of combined energy values 505'. The combined energy value 505' for each index symbol is fed into the dual maxima metric generator 610 which uses a dual-maxima decoding algorithm (which approximates the maximum a posteriori (MAP) decoding algorithm). After acquiring a complete group of combined energy values 505', one combined energy value 505' for each index symbol, the dual-maxima metric generator 610 first searches for the largest combined energy value 505' in a first subset of the group of combined energy values 505' which have associated index symbols having "0" as the first digit. The dual-maxima metric generator then searches for the largest combined energy value 505' in a second subset of the group of combined energy values 505' which have associated index symbols having "1" as a first digit. The difference in the largest combined energy value 505' in the first subset with the largest combined energy value 505' in the second subset is output from the dual-maxima metric generator 610 as the first bit of soft decision data 545' for the first digit of the index symbol corresponding to the most likely orthogonal code. In other words, the first bit in the soft decision data 545' represents a measure of confidence of the value of the first digit of the interleaved data symbol actually sent.

Next, the dual-maxima metric generator searches for the largest combined energy value 505' in a third subset of the group of combined energy values 505' which have associated index symbols having "0" as a second digit and searches for the largest combined energy value 505' in the fourth subset of the group of combined energy values 505' which have associated index symbols having "1" as the second digit. The difference in the largest combined energy values is output as the second bit of soft decision data 545' for the second digit of the index symbol corresponding to the most likely orthogonal code. In other words, the second bit in the soft decision data 545' represents a measure of confidence of the value of the second digit of the interleaved data symbol actually sent.

This process continues until the dual-maxima metric generator 610 generates soft decision data 545' for the last digit in the index symbol most likely sent.

The soft decision data 545' for all the digits of the index symbol most likely sent is then carried to the deinterleaver 550'. The deinterleaver 550' de-interleaves the soft decision data 545' generating deinterleaved soft decision data 555'. The deinterleaved soft decision data 555' is then carried to the decoder 560' (typically a viterbi decoder) which decodes the deinterleaved soft decision data 555' into estimated digital traffic data bits 565'.

Sometimes the base stations use simple dual maxima receivers that do not use the rake receiver design. Such receivers only have one finger.

The method used by simple dual maxima receivers to generate the soft decision data for the $k^{th}$ block of transformer output signals can be represented mathematically fairly easily as follows:

$$\Delta_{k,i} = max\{|r_{k,m}|^2, m \in S_i\} - max\{|r_{k,m}|^2, m \in \overline{S}_i\} 1 \leq i \leq n$$

where $S_i = \{$all m, $i^{th}$ corresponding bit is "0"$\}$ and $\overline{S}_i = \{$all m, $i^{th}$ corresponding bit is "1"$\}$ and where n is a function of the total number of orthogonal codes used and where $\Delta_{k,i}$ is the $i^{th}$ soft decision bit of the soft decision data associated $k^{th}$ block of transformer output signals. (e.g. if 64 orthogonal codes are used, then n equal six).

A dual-maxima receiver is described in U.S. Pat. No. 5,442,627 entitle "Non-Coherent Receiver Employing a Dual-Maxima Metric Generation Process" and issued to Qualcomm Incorporated on Aug. 15, 1995. The patent is incorporated by reference herein in its entirety.

Despite the improved bit error performance of the dual-maxima receiver over the single maxima receiver, there is still a need for an improved receiver with even better bit error performance than offered with the dual-maxima receiver. Such an improved receiver is needed to increase the system capacity of CDMA communications systems and better utilize the scarce RF spectrum.

SUMMARY OF THE INVENTION

It is an object of the present invention to provide a method and apparatus for improving the bit error performance of data receivers.

It is an object of the present invention to provide a method and apparatus for detecting a traffic signal carried in a demodulated signal.

It is also an object of the present invention to provide an improved method and apparatus for receiving orthogonal signals.

In accordance with one aspect of the present invention, there is provided a detector for detecting a traffic signal from a first demodulated signal supplied by a receiver section. The detector comprises a first stage for receiving the first demodulated signal and generating a first estimate of the traffic signal from the first demodulated signal and a second stage connected to the first stage. The second stage receives the first demodulated signal and the first estimate of the traffic signal and generates a second estimate of the traffic signal from the first demodulated signal and the first estimate of the traffic signal.

In accordance with another aspect of the present invention, there is provided a method of detecting a traffic signal from a first demodulated signal supplied by a receiver section. The method comprises the steps of (a) generating an estimate of the traffic signal from the first demodulated signal using a first stage and (b) generating another estimate of the traffic signal from the first demodulated signal and the estimate of the traffic signal obtained from step (a) using a second stage.

In accordance with another aspect of the present invention, there is provided a method of detecting a traffic signal from a first demodulated signal supplied by a receiver section. The method comprises the steps of (a) generating an estimate of the traffic signal from the first demodulated signal, (b) generating another demodulated signal from the estimate of the traffic signal obtained from step (a), (c) generating a channel information signal from the demodulated signal obtained from step (b) and the first demodulated signal and (d) generating another estimate of the traffic signal using the first demodulated signal and the channel information signal obtained from step (c).

In accordance with another aspect of the present invention, there is provided a detector for detecting a traffic signal from a first modulated signal supplied by a receiver section. The detector comprises a first stage for receiving the first modulated signal and generating a first estimate of the traffic signal from the first modulated signal and a second stage connected to the first stage. The second stage receives the first modulated signal and the first estimate of the traffic signal and generates a second estimate of the traffic signal from the first modulated signal and the first estimate of the traffic signal.

In accordance with another aspect of the present invention, there is provided a method of detecting a traffic signal from a first modulated signal supplied by a receiver section. The method comprises the steps of (a) generating an estimate of the traffic signal from the first modulated signal using a first stage and (b) generating another estimate of the traffic signal from the first modulated signal and the estimate of the traffic signal obtained from step (a) using a second stage.

In accordance with another aspect of the present invention, there is provided a method of detecting a traffic signal from a first modulated signal supplied by a receiver section. The method comprises the steps of (a) demodulating the first modulated signal into a first demodulated signal, (b) generating an estimate of the traffic signal from the first demodulated signal, (c) generating another modulated signal from the estimate of the traffic signal obtained from step (b), (d) generating a channel information signal from the modulated signal obtained from step (c) and the first modulated signal and (e) generating another estimate of the traffic signal using the first demodulated signal and the channel information signal obtained from step (d).

DETAILED DESCRIPTION OF THE DRAWINGS

A detailed description of the preferred embodiments of the present invention is provided below with reference to the following drawings, in which.

DETAILED DESCRIPTION OF THE PREFERRED EMBODIMENTS

Figure 1:
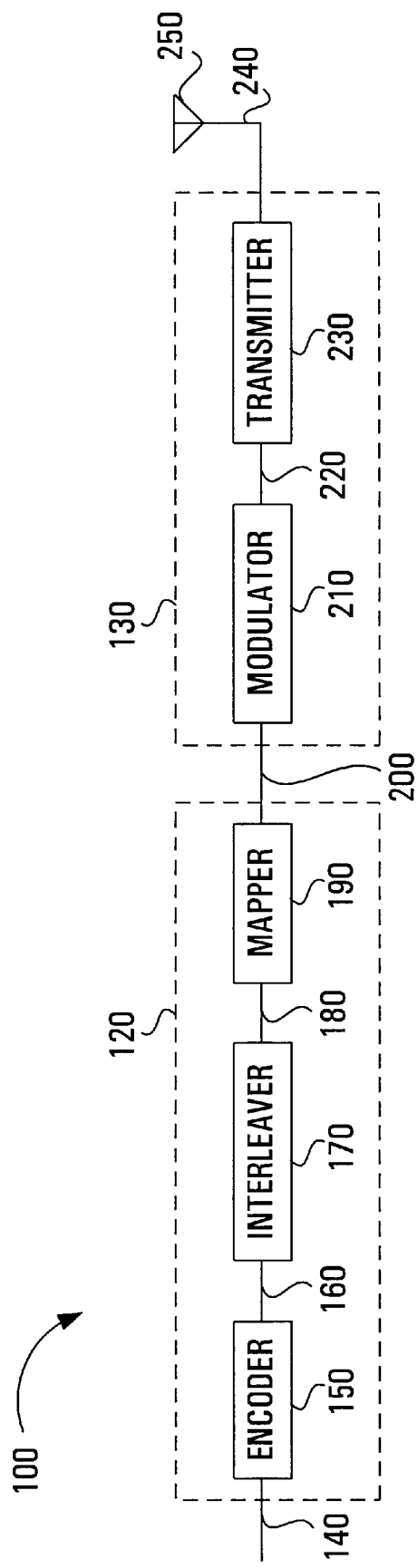
FIG. 1 is a block diagram of a conventional transmitter used by a mobile station in a CDMA communications network.

Referring to FIG. 1, in a conventional CDMA communications system, each mobile station sends traffic typically to the closest base station using a transmitter 100. The transmitter 100 consists of an encoding section 120 and modulating and transmitting section 130. The encoding section 120 is connected to the modulating and transmitting section 130. The transmitter 100 does not send a pilot (or reference) signal.

The encoding section 120 of the transmitter 100 consists of an encoder 150, an interleaver 170 and a mapper 190. The encoder 150 is connected to the interleaver 170 which is connected to the mapper 190. The modulating and transmitting section 130 consists of a modulator 210, a transmitter 230 and an antenna 250. The modulator 210 is connected to the transmitter 230 and the mapper 190. The transmitter 230 is connected to the antenna 250.

The transmitter 100 sends digital traffic (or a digital traffic signal) comprising traffic digital data bits 140. If the traffic is originally in analog form (i.e. analog traffic), such as voice, then an analog to digital to digital (A/D) converter or similar device is first employed to convert the analog traffic to digital traffic (comprising traffic digital data bits 140). The digital traffic data bits 140 are fed into the encoding section 120 of the transmitter 100 typically at 9600 kbits/sec. (Other speeds may be used). In particular, the traffic digital data bits 140 are first fed into the encoder 150 which encodes the traffic digital data bits 140 into data symbols 160 using an encoding algorithm which facilitates the maximum likelihood decoding of the received traffic by the base station serving the mobile station. The encoder 150 typically uses a convolution encoding algorithm. (Other algorithms may be used such as block coding algorithms). The encoder outputs the data symbols 160 at a fixed encoding rate of one data bit to three data symbols. (Other encoding rates such a one data bit to 2 data symbols may be used). The encoder 150 typically outputs the data symbols at 28.8 ksym/sec (other symbol rates may be used depending on the speed of the traffic digital data bits 140 being fed into the encoder 150 and the encoding rate). The data symbols 160 are fed into the interleaver 170 which block interleaves the data symbols 160 at the symbol level. The interleaver 170 fills a matrix of a predetermined size with the data symbols 160 in a column by column basis. The preferred predetermined size of the matrix is 32 rows by 18 columns (i.e. 576 cells). The size of the matrix depends on the length of a transmission block and the speed of the data symbols 160 sent from the encoder 150. The preferred length of a transmission block is 20 milliseconds (as specified by the ANSI J-STD-008 Standard). Consequently, since the preferred encoder outputs the data symbols 160 at 28.8 ksym/sec, the matrix must hold 576 data symbols 160 (i.e. 28.8 ksym/sec times 20 ms). Hence, a matrix of 18 by 32 is used.

The interleaver 170 outputs interleaved data symbols 180 from the matrix in a row by row manner at the same rate the data symbols 160 were inputted in the interleaver 170 (e.g. 28.8 ksym/sec). The interleaved data symbols 180 are fed into the mapper 190. The mapper 190 maps (or encodes) every group of 6 interleaved data symbols 180 into a corresponding Walsh code 200 from a group of 64 Walsh codes 200. Each Walsh code 200 is 64 bits long. (Alternatively, other orthogonal codes can be used other than Walsh codes. Furthermore, the mapper 190 may map more or less than six interleaved data symbols 180 into a corresponding orthogonal code depending the length of the orthogonal codes selected). The mapper 190 outputs the Walsh codes 200 typically at a fixed rate of 307.2 ksymbols/sec. (Alternatively, other symbol rates can be used depending on the rate the interleaver 170 outputs interleaved data symbols 180 and the length of the orthogonal codes used). The digital signal comprising the Walsh codes 200 may be called a sent signal.

A frame of data symbols 160 (or a frame of interleaved data symbols 180) completely fills the matrix of the predetermined size used by the interleaver 170 (i.e. 576 cells in this case). Since the encoder 150 outputs the data symbols 160 at a fixed encoding rate of one data bit to three data symbols, 192 traffic digital data bits 140 are needed. (i.e. a frame of digital traffic data bits 140 has 192 bits). Since every group of 6 interleaved data symbols 180 are mapped into an orthogonal code, every frame of interleaved data symbols 180 is represented by 96 orthogonal codes.

The Walsh codes 200 are fed into the modulating and transmitting section 130 of the transmitter 100. In particular, the Walsh codes 200 are first fed into the modulator 210. The modulator 210 first spreads each Walsh code 200 with a long binary pseudo noise (PN) code in order to generate a respective pseudo noise (PN) sequence. Each mobile station 200 is assigned a unique long binary pseudo noise PN code with which to spread the Walsh code 200. (Alternatively, other long spreading codes may be used other than long binary PN codes). The long binary PN codes not only identify the mobile station but also enhance security by scrambling the traffic. The modulator 210 outputs the PN sequences at a high fixed PN chip rate (typically 1.228 mchips/sec). The resulting PN sequences facilitate the base station servicing the mobile station to discriminate or detect the RF signals carried on different reverse paths.

The modulator 210 then spreads the PN sequences with a pair of different short spreading codes (of the same length) in order to generate in-phase channel (or I-phase channel) and quadrature phase channel (or q-phase channel) spread sequences 220. The in-phase channel and the corresponding quadrature phase spread sequences 220 may be represented as a digital signal with complex attributes. That is, each in-phase channel spread sequence and each corresponding quadrature phase spread sequence 220 may be represented as a complex sequence.

The I-phase channel and the q-phase channel spread sequences 220 are then fed into the transmitter 230. The I-phase channel and the q-phase channel spread sequences 220 biphase modulate a quadrature pair of sinusoids. The sinusoids are summed and bandpassed limited with a bandpass filter. The bandpassed limited summed sinusoids modulate a RF carrier (which may be amplified) to generate a spread spectrum RF signal 240 which is radiated by the antenna 250.

The spread spectrum RF signal is received by a receiver at the base station. Each base station typically has a plurality of receivers, one for each mobile station to be serviced. The spread spectrum RF signal commonly arrives at the base station servicing the mobile station as a plurality of spread spectrum RF signals travelling on a plurality of different reverse paths. In a conventional CDMA communications system, the receivers are typically single maxima or dual maxima receivers as previously described.

Figure 5:
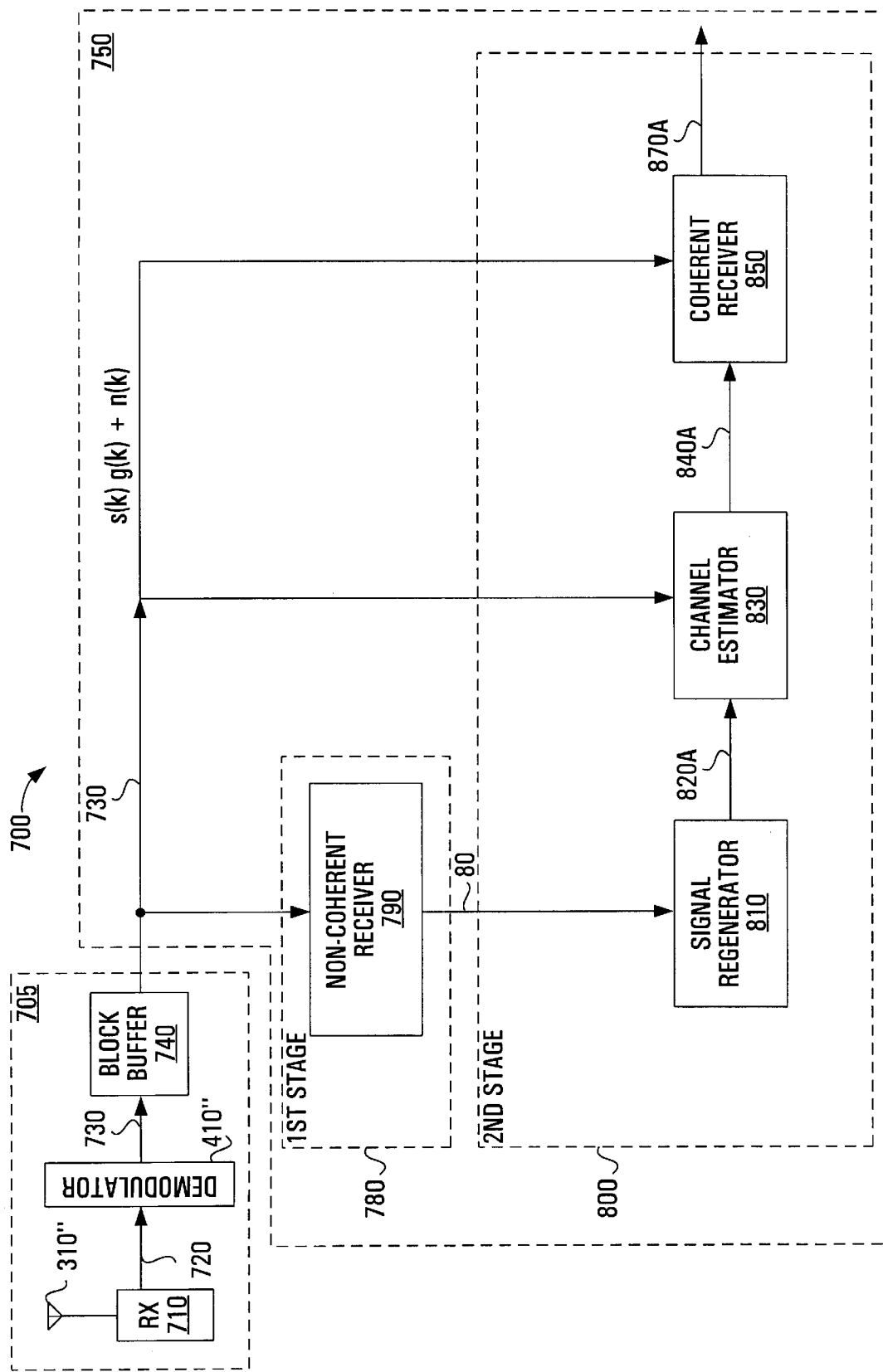
FIG. 5 is a block diagram of an improved multi stage receiver in accordance with a first preferred embodiment of the present invention.

In accordance with a first preferred embodiment of the present invention there is provided a multi stage receiver 700. Referring to Referring to FIG. 5, the multi stage receiver 700 consists of a receiver and demodulator section 705 and a detector and decoder section 750.

Figure 2:
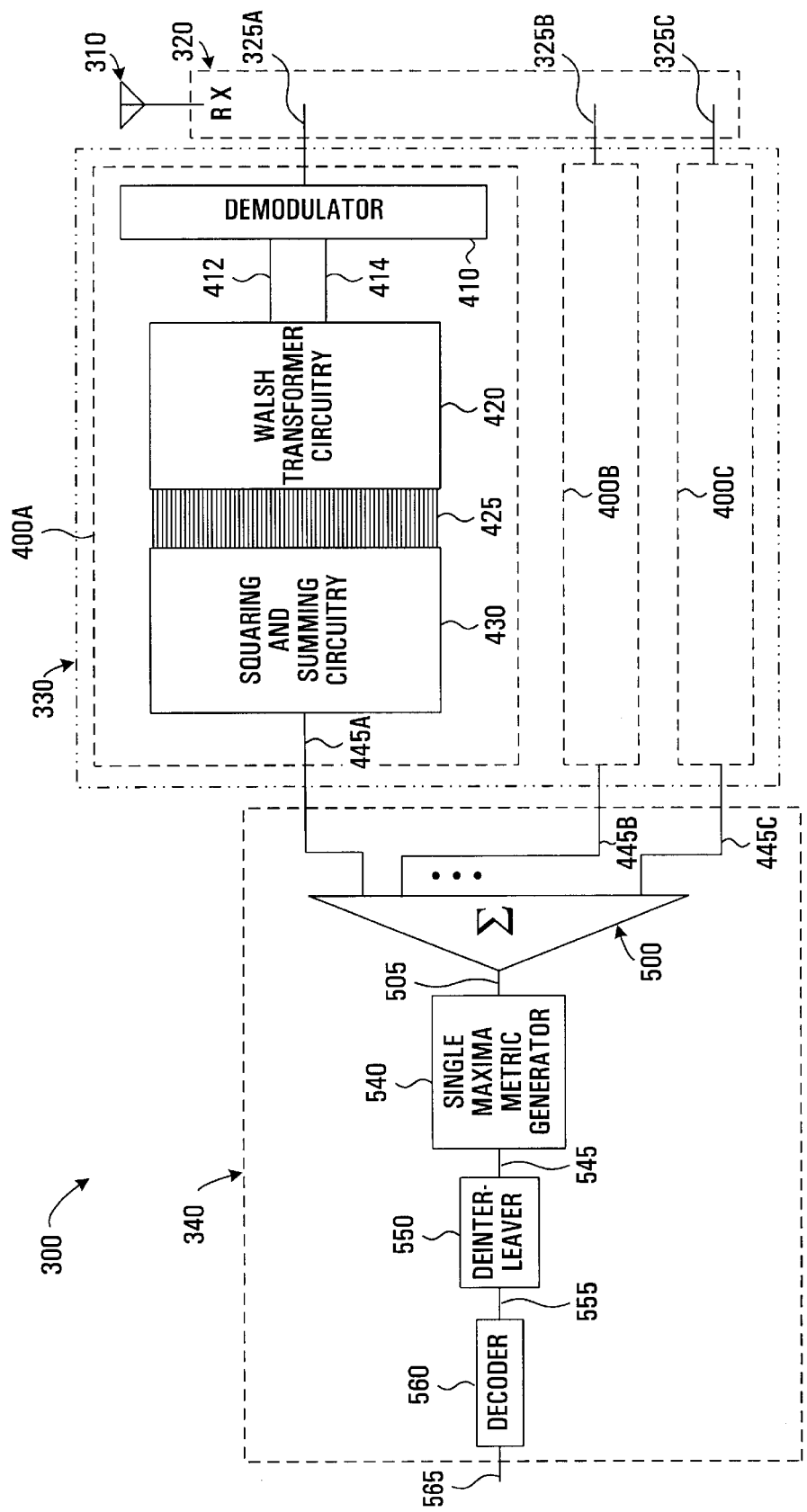
FIG. 2 is a block diagram of a conventional single maxima receiver used by a base station in a CDMA communications network.
Figure 3:
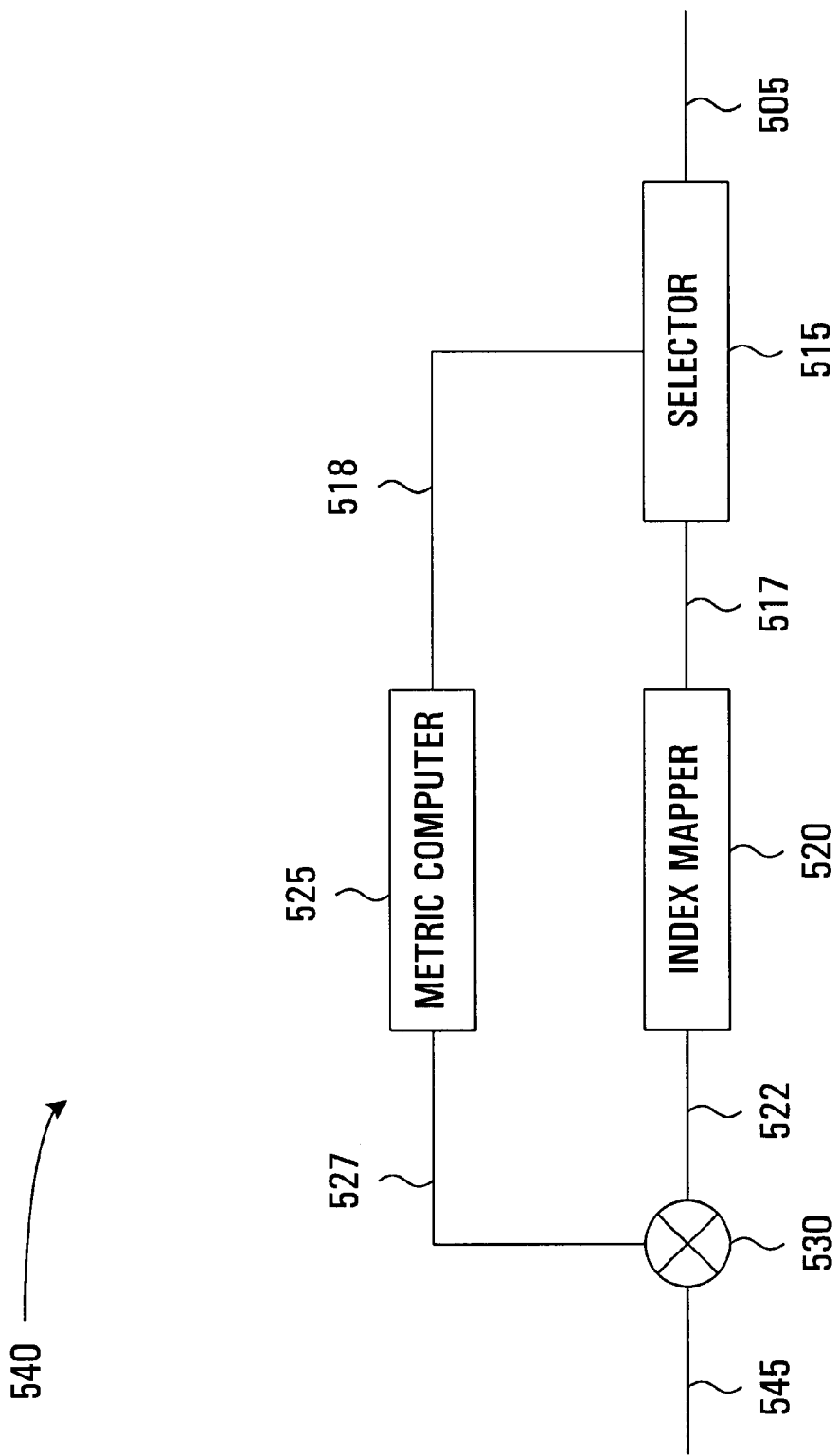
FIG. 3 is a block diagram of a single maxima metric generator used by the single maxima receiver shown in FIG. 2.

The receiver and demodulator section 705 consists of an antenna 310", a receiver 710, a demodulator 410" and a block buffer 740. The receiver 710 is connected to the antenna 310" and to the demodulator 410". The demodulator 410" is connected to the block buffer 740. The antenna 310" and the demodulator 410" are identical to the antenna 310 and the demodulator 410 found in the single maxima receiver 300 shown in FIG. 2.

The detector and decoder section 750 consists of a first stage 780 and a second stage 800 connected to each other. The detector and decoder section 750 is connected to the receiver and demodulator section 705. In particular, the block buffer 740 is connected to the first stage 780 and to the second stage 800. The first stage 780 consists of a conventional non-coherent receiver 790. The second stage 800 consists of a signal regenerator 810, a channel estimator 830 and a coherent receiver 850. The channel estimator 830 is connected to the signal regenerator 810, to the coherent receiver 850 and to the block buffer 740. The conventional non-coherent receiver 790 is connected to the signal regenerator 810. The block buffer 740 is also connected to the coherent receiver 850.

The receiver 710 consists of a searcher receiver and a data receiver. For each RF signal sent by the transmitter 100 of a mobile station, the searcher receiver searches the received spread-spectrum RF signals arriving via the various reverse paths for the strongest spread-spectrum RF signals associated with the transmitter 100 of the mobile station (as identified by the PN code). The searcher receiver then instructs the data receiver to track and receive the RF signal carried in the reverse path with the strongest level. In particular, the data receiver demodulates the respective spread-spectrum RF signal and translates the respective spread-spectrum RF signal from the RF frequency to a processed received signal at a lower frequency. Furthermore, the data receiver samples at the PN chip rate (e.g. 1.2288 msamples/sec) the processed received signal to generate respective data samples 720 for the demodulator 410".

The demodulator 410" de-spreads the processed received signal by correlating the processed received signal with long PN code associated with the mobile station and the short spreading codes. In particular, the demodulator 410" produces samples of an in-phase signal and corresponding samples of a quadrature phase signal. The samples of the in-phase signal and the corresponding samples of the quadrature phase signal may be represented as one digital signal with complex attributes. That is, the samples of the in-phase signal and the corresponding samples of the quadrature phase signal may be represented as demodulated samples 730 using complex numbers. This digital signal may be called a first demodulated signal.

The first demodulated signal may be represented mathematically as follows:

$$r(k)=s(k)g(k)+n(k)$$

where k is the number of the sample, r(k) represent the demodulated samples 730 of the first demodulated signal, s(k) represent the samples of the sent signal (generated by the transmitter 100), g(k) represent samples of a channel information signal and n(k) represent samples of received noise. r(k), s(k), g(k) and n(k) are all complex. The sent signal carry the Walsh codes 200 actually sent by the transmitter 100. Since the RF signal actually sent by the transmitter 100 may undergo amplitude changes and/or phase changes as the RF signal propagates through the air, g(k) is used to provide the necessary channel information to reflect these changes. The samples of the noise represent noise introduced as the RF signal propagates through the air from the transmitter 100 to the multi stage receiver 700.

The demodulated samples 730 are carried to the block buffer 740. The block buffer 740 buffers sets of demodulated samples 730. Each set of received signals 730 is used to attempt to reconstruct one frame of interleaved data symbols 180. Since 96 orthogonal codes were used to send a frame of interleaved data symbols 180 and since each orthogonal code is 64 bits long, each set consists of 6144 demodulated samples 730 which are buffered by the block buffer 740.

Once the block buffer 740 has a set of 6144 demodulated samples 730, the block buffer 740 sends a block of the demodulated samples 730, typically one received sample 730 at a time, to the first stage 780. The first stage simply comprises a conventional non-coherent receiver 790 which simply transforms the block of the demodulated samples 730 into 192 traffic data bits 80 (i.e. a frame of traffic data bits 80) which represent a first estimate of the original digital traffic (i.e. the original traffic digital data bits 140) sent by the transmitter 100.

Figure 6:
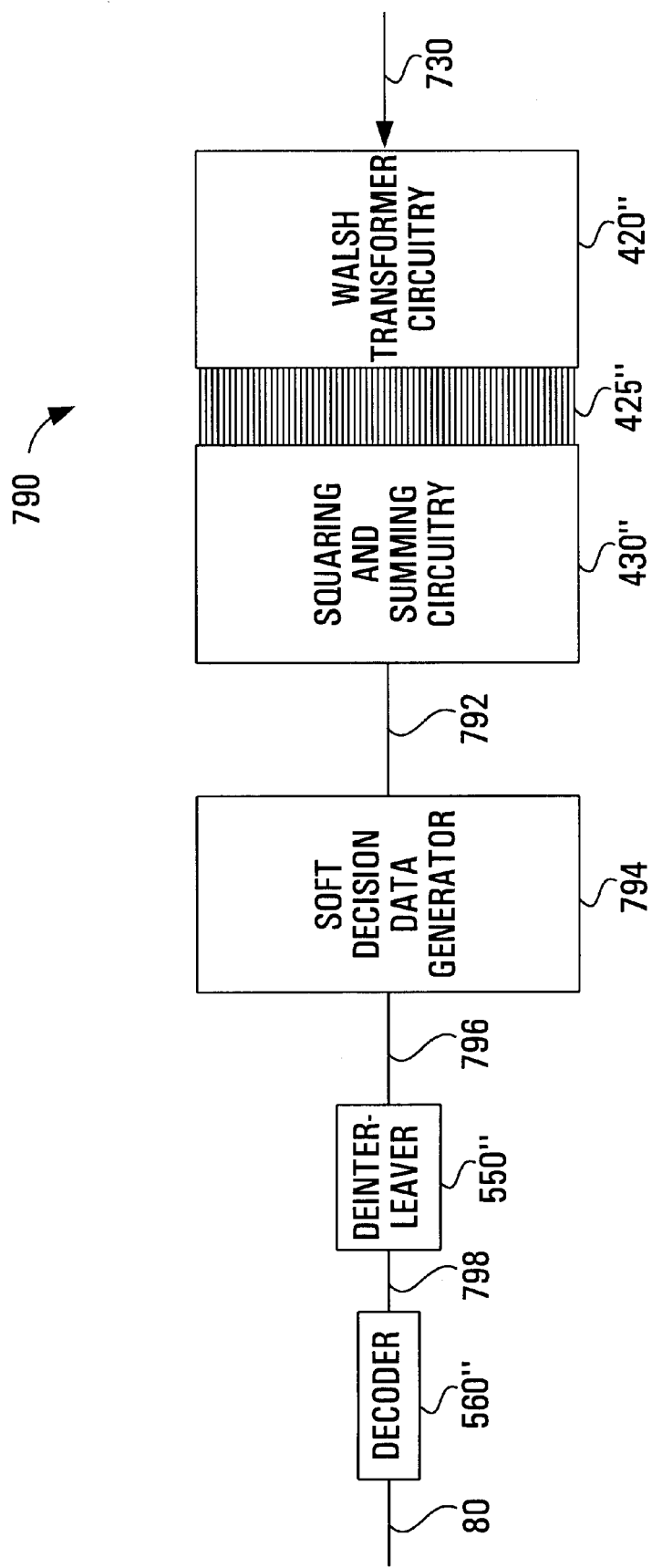
FIG. 6 is a block diagram of a conventional non-coherent receiver shown in FIG. 5.

The conventional non-coherent receiver 790 may be a modified single maxima receiver or a modified dual maxima receiver. Referring in particular to FIG. 6, the modified single maxima receiver or the modified dual maxima receiver simply consists of a conventional single maxima receiver 300 or a conventional dual maxima receiver 600 respectively (as previously described) without the receiver section (330 and 330' respectively) and the demodulator (410 and 410' respectively) in the detector section (330 and 330' respectively). The convention non-coherent receiver 790 consists of Walsh transformer circuitry 420", squaring and summing circuitry 430", a soft decision data generator 794, a deinterleaver 550" and a decoder 560". The Walsh transformer circuitry 420" and the squaring and summing circuitry 430" are identical to the Walsh transformer circuitry 420 and the squaring and summing circuitry 430 in the detector section 330 of the single maxima receiver 300 shown in FIG. 2 and operate in exactly the same way. Similarly, the deinterleaver 550" and the decoder 560" are identical to the deinterleaver 550 and the decoder 560 in the decoder section 340 of the single maxima receiver 300 shown in FIG. 2 and operate in exactly the same way.

The demodulated samples 730 are simply first fed into the Walsh transformer circuitry 420". For every group of demodulated samples 730, the Walsh transformer circuitry 420" generates 64 complex transformer output signals 425", one for each Walsh code. (Each complex transformer output signal 425" is complex with one part representing a transformer output signal related to the in-phase component of the demodulated samples 730 and another part representing a transformer output signal related to the quadrature phase component of the demodulated samples 730).

Each block of complex transformer output signals 425" is carried to the squaring and summing circuitry 430" which converts each block of complex transformer output signals into a group of energy values 792 (or decision values). Each energy value 792 within the group of energy values 792, associated with a particular group of demodulated samples 730, represents a measure of confidence that the group of demodulated samples 730 corresponds to a particular orthogonal code with a corresponding index value. Consequently, each row of the block of complex transformer signals 425" (i.e. each transformer signal) corresponds to a measure of confidence that a particular group of demodulated samples 730 corresponds to a particular orthogonal code from within the set of mutually orthogonal codes. Since each orthogonal code from the set of mutually orthogonal codes has a corresponding index symbol, each energy value 792 also has an associated index symbol.

Figure 4:
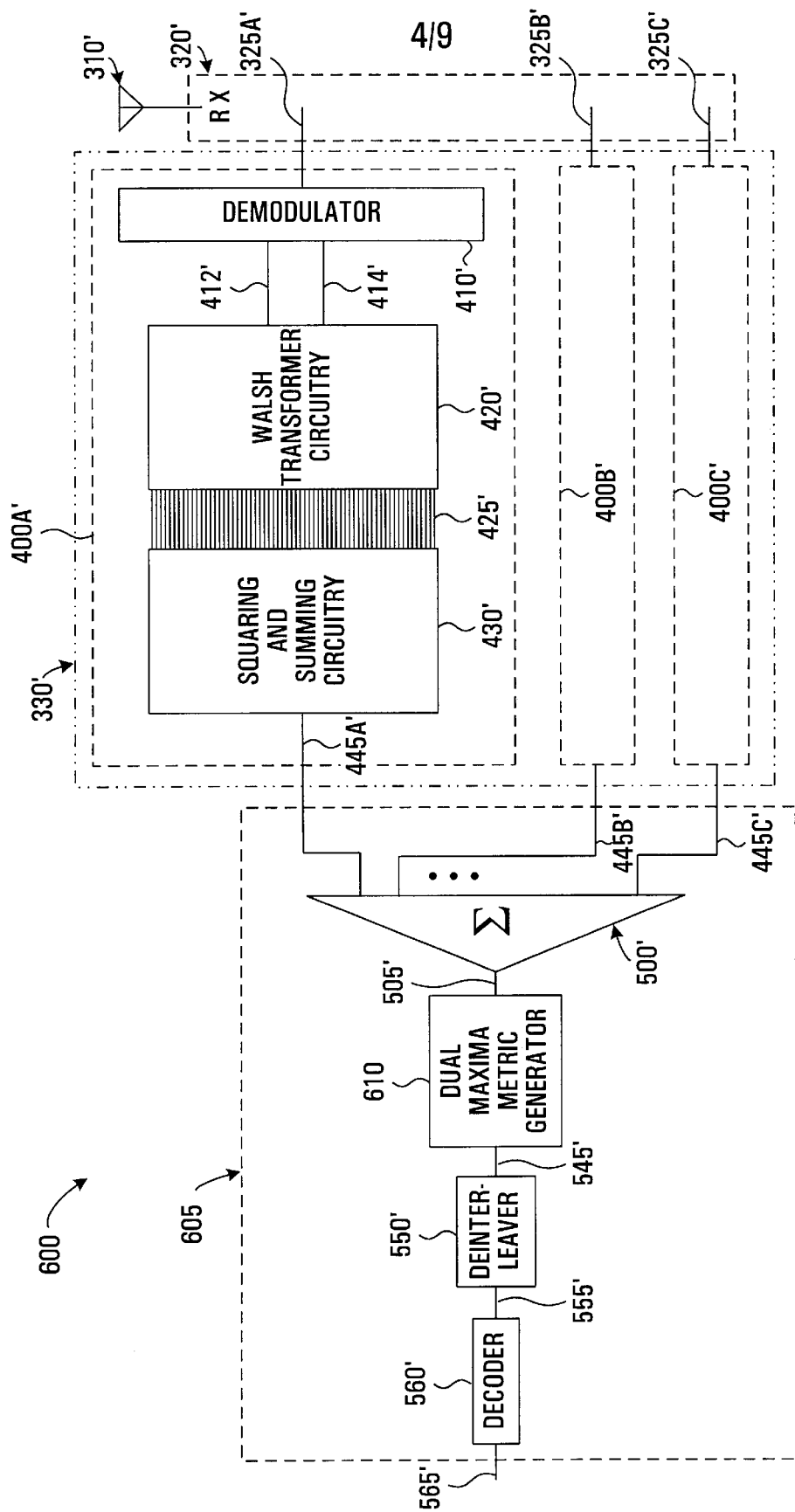
FIG. 4 is a block diagram of a conventional dual maxima receiver used by a base station in a CDMA communications network.

Each group of energy values 792 is carried to the soft decision data generator 794. The soft decision data generator 794 transforms each group of energy values 792 into soft decision data 796 typically using either a single maxima metric generator 540 or dual maxima metric generator 610 shown in FIGS. 2 and 4. For example, the soft decision data generator 794 may be simply a dual-maxima metric generator 610 which converts the groups of energy values 792 into soft decision data 796 using the method previously described.

Alternatively, the soft decision data generator 794 may be a single maxima metric generator 540 which converts the groups of energy values 792 into soft decision data 796 using the method previously described.

The soft decision data 796 is carried from the soft decision data generator 794 to the deinterleaver 550". The soft decision data 796 is inputted into a matrix of the predetermined size (32 rows by 18 columns) in a row by row manner. After the deinterleaver receives soft decision data for 96 groups of demodulated samples 730 (i.e. 96 Walsh blocks for 96 orthogonal codes), the matrix of the predetermined size (i.e. 32 rows by 18 columns) will be full. The deinterleaver 550" then outputs the soft decision data as data symbols 798 in a column by column manner. The data symbols 798 are carried to the decoder 560" which decodes the data symbols 798 into traffic data bits 80. As mentioned earlier, the traffic data bits 80 are the first estimate of the traffic digital data bits 140 sent by the transmitter 100.

Figure 7:
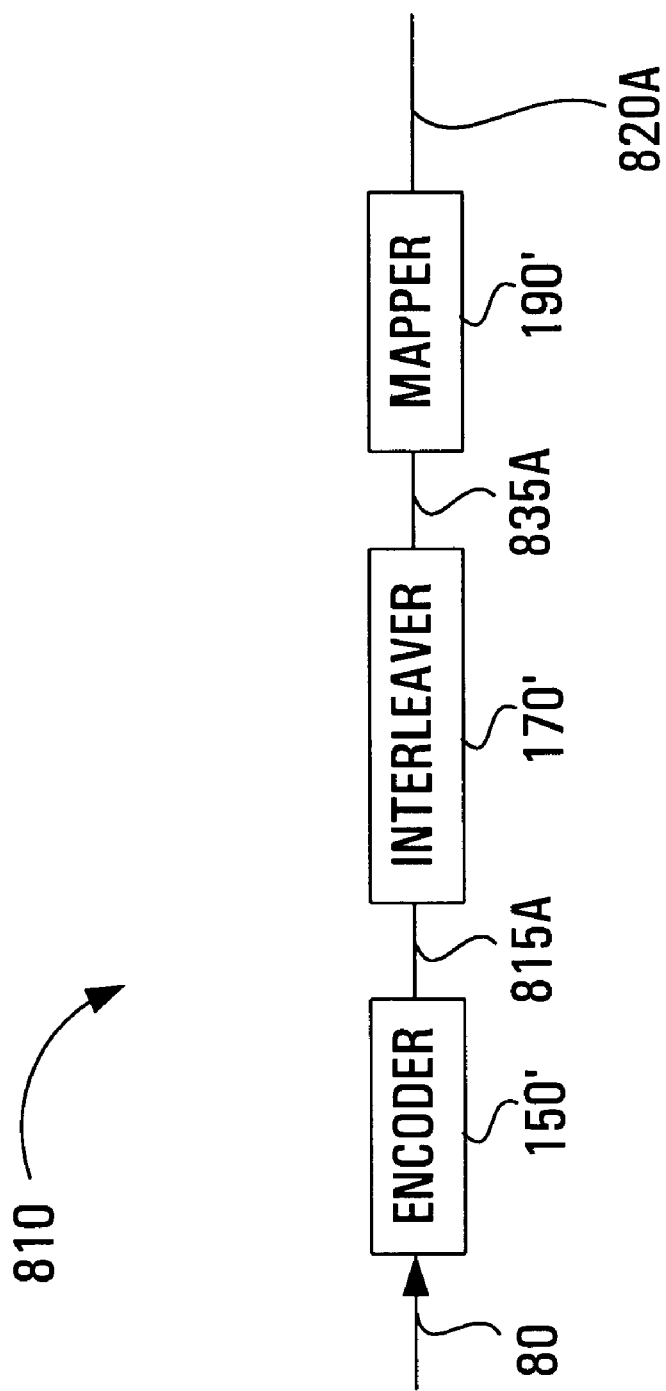
FIG. 7 is a block diagram of a signal regenerator shown in FIG. 5.

The traffic data bits 80 are carried from the first stage 780 to the second stage 800. In particular, the traffic data bits 80 are carried from the non-coherent receiver 790 to the signal regenerator 810. Referring in particular to FIG. 7, the signal regenerator 810 comprises an encoder 150', an interleaver 170', and a mapper 190' which are identical to the encoder 150, the interleaver 170 and the mapper 190 found in the transmitter 100 shown in FIG. 1 and operate in exactly the same way. The interleaver 170' is connected to the encoder 150' and to the mapper 190'.

The data bits 80 are fed into the encoder 150' which encodes the data bits 80 into data symbols 815A using the same encoding algorithm used by the transmitter 100. The encoder 150' outputs the data symbols 815A at the same fixed encoding rate used by the transmitter 100 (e.g. one data bit to three data symbols). The encoder 150' typically outputs the data symbols 815A at the same rate that the encoder 150 in the transmitter 100 outputs the data symbols. (e.g. 28.8 ksym/sec). The data symbols 815A are fed into the interleaver 170' which block interleaves the data symbols 815A in exactly the same way as the interleaver 170 in the transmitter 100 interleaves the data symbols 160 (i.e. at the symbol level). The interleaver 170' fills a matrix of the predetermined size with the data symbols 815A in a column by column basis. (The predetermined size of the matrix is 32 rows by 18 columns (i.e. 576 cells)).

The interleaver 170' outputs interleaved data symbols 835A from the matrix in a row by row manner at the same rate the data symbols 815A were inputted in the interleaver 170' (e.g. 28.8 ksym/sec). The interleaved data symbols 835A are fed into the mapper 190'. The mapper 190' maps (or encodes) every group of 6 interleaved data symbols 835A into a corresponding Walsh code 820A from a group of 64 Walsh codes. The mapper 190' outputs the Walsh codes 820A typically at a fixed rate of 307.2 ksymbols/sec.

The digital signal comprising the Walsh codes 820A may be called a second demodulated signal. The Walsh codes 820A are a first estimate of the sent signal (i.e. s(k)) generated by the transmitter 100.

The Walsh codes 820A (i.e. the estimate of s(k)) are carried from the mapper 190' to the channel estimator 830. In addition, the block of demodulated samples 730 are also carried from the block buffer 740 to the channel estimator 830. Since it takes time for the non-coherent receiver 790 and the signal regenerator 810 to process and transform the block of demodulated samples 730 into the Walsh codes 820A, the channel estimator 830 delays the block of demodulated samples 730 for a first predetermined time to ensure that the Walsh codes 820A are synchronized with the demodulated samples 730. Using conventional techniques known in the art, the channel estimator 830 generates samples 840A, which represent a first estimate of the channel information signal g(k), using the Walsh codes 820A and the demodulated samples 730.

The samples 840A (i.e. representing g(k)) are carried from the channel estimator 830 to the coherent receiver 850. In addition the block of the demodulated samples 730 are carried from the block buffer 740 to the coherent receiver 850. Since it takes time for the non-coherent receiver 790, the signal regenerator 810 and the channel estimator 830 to generate the samples 840A (i.e. g(k)), the coherent receiver 850 block delays the block of received signals 730 for a second predetermined time to ensure that the samples 840A (i.e. g(k)) are synchronized with the demodulated samples 730. The coherent receiver 850 is typically a conventional coherent receiver. The coherent receiver 850 uses the synchronized demodulated samples 730 (i.e. r(k)) and the samples 840A (i.e. g(k)) to generate traffic data bits 870A which represent a second estimate of the original digital traffic (i.e. the original traffic digital data bits 140) sent by the transmitter 100. The second estimate of the original traffic digital data bits 140 is better than the first estimate of the original traffic digital data bits 140. Consequently, the multi stage receiver 700 typically has a better bit error performance than the conventional single maxima receiver 300 or the dual maxima receiver 600 shown in FIGS. 2 and 4.

Figure 8:
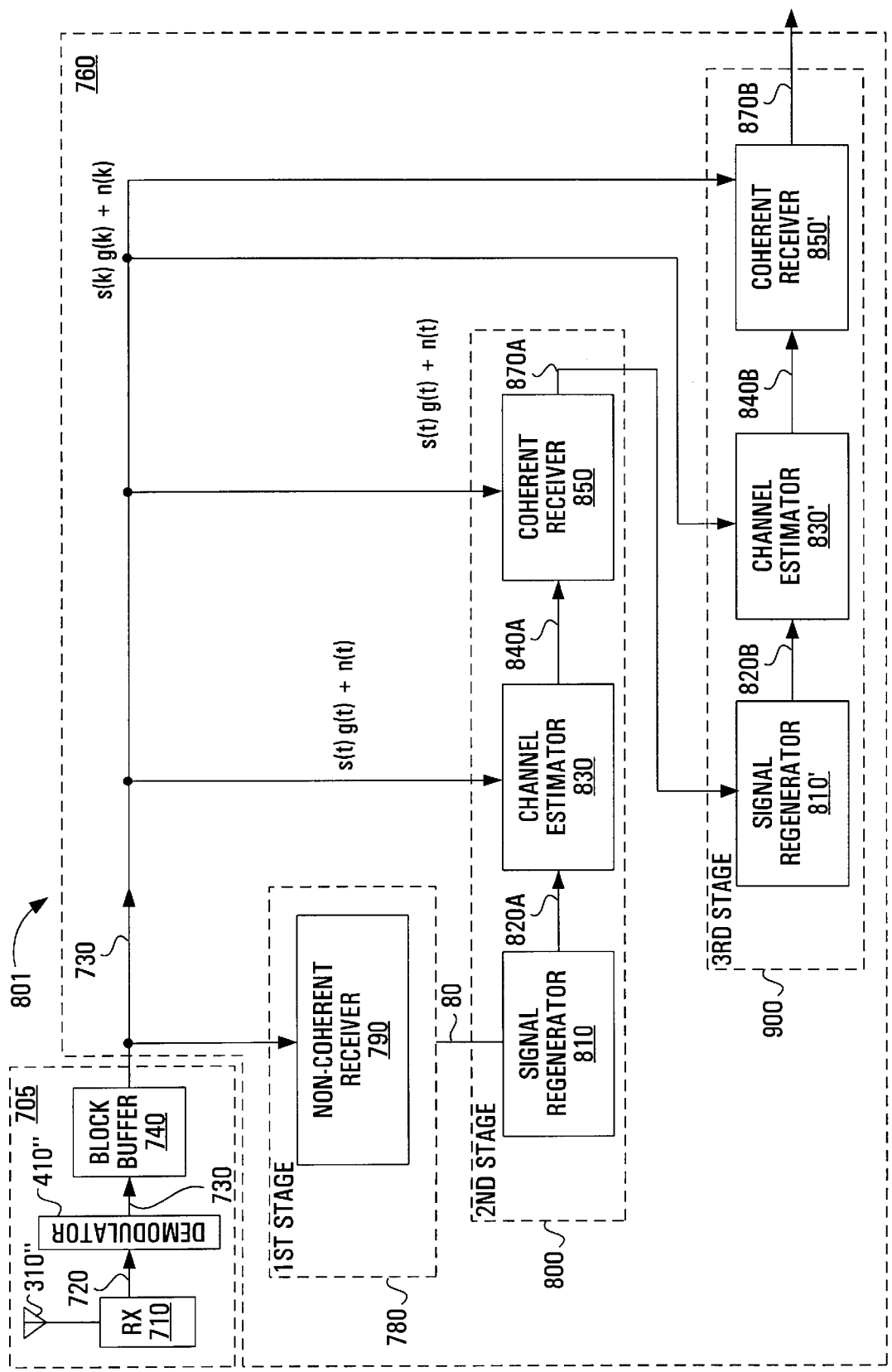
FIG. 8 is a block diagram of an improved multi stage receiver in accordance with a second preferred embodiment of the present invention.

Other stages identical to the second stage 800 can be added to the multi stage receiver 700. In accordance with a second preferred embodiment of the present invention, there is provided a multi stage receiver 801 with a detector and decoder stage 760 with a third stage 900 as shown in FIG. 8. The multi stage receiver 801 is identical to the multi stage receiver 700 with the addition of the third stage 900. The third stage 900 is connected to the second stage 800 and to the receiver section 705.

The third stage 900 is similar to the second stage 800 and operates in a similar way. The third stage 900 consists of a signal regenerator 810', a channel estimator 830' and a coherent receiver 850' which are essentially identical to the signal regenerator 810', the channel estimator 830 and the coherent receiver 850 in the second stage 800. The channel estimator 830' is connected to the signal regenerator 810' and to the coherent receiver 850'. The third stage 900 is connected to the second stage 800 and to the block buffer 740. In particular, the coherent receiver 850 in the second stage 800 is connected to. the signal regenerator 810' in the third stage 900. The block buffer 740 is connected to the channel estimator 830' and to the coherent receiver 850'.

In operation, the receiver section 705, the first stage 780 and the second stage 800 operate in exactly the same was as previously described for the multi stage receiver 700 shown in FIG. 5. That is, the received RF signal is translated to a processed received signal which is sampled and demodulated generating demodulated samples 730 of the first demodulated signal. A block of the received signals 730 is carried to the first stage 780 and to the second stage 800 which generate traffic data bits 870A as previously described.

The traffic data bits 870A are carried from the coherent receiver 850 in the second stage 800 to the signal regenerator 810' in the third stage 900. The signal regenerator 810' operates in exactly the same way as the signal regenerator 810 in the multi stage receiver 700. That is, the signal regenerator 810' transforms traffic data bits 870A into Walsh codes 820B which represent a second estimate of the sent signal s(k). The digital signal comprising the Walsh codes 820B may be called a third demodulated signal.

The Walsh codes 820B (i.e. the estimate of s(k)) are carried from the signal regenerator 810' to the channel estimator 830' which operates in the same way as the channel estimator 830 in the multi stage receiver 700. That is, the block of demodulated samples 730 are also carried from the block buffer 740 to the channel estimator 830'. Since it takes time for the first stage 780, the second stage 800 and the signal regenerator 810' to process and transform the block of demodulated samples 730 into the Walsh codes 820B, the channel estimator 830' delays the block of demodulated samples 730 for a third predetermined time in order to synchronize the demodulated samples 730 with the Walsh codes 820B. Using conventional techniques known in the art, the channel estimator 830' generates samples 840B using the Walsh codes 820B and the demodulated samples 730. The samples 840B represent a second estimate of the channel information signal (g(k)).

The samples 840B (i.e. representing the second estimate of g(k)) are carried from the channel estimator 830' to the coherent receiver 850'. In addition the block of the demodulated samples 730 are carried from the block buffer 740 to the coherent receiver 850'. Since it takes time for the first stage 780, the second stage 800, the signal regenerator 810' and the channel estimator 830' to generates samples 840B (i.e. g(k)), the coherent receiver 850' block delays the block of received signals 730 for a fourth predetermined time to ensure that the samples 840B (i.e g(k)) are synchronized with the demodulated samples 730. The coherent receiver 850' is typically a conventional coherent receiver. The coherent receiver uses the synchronized demodulated samples 730 (i.e. r(k)) and the samples 840B (i.e. g(k)) to generate traffic data bits 870B which represent a third estimate of the original digital traffic (i.e. the original traffic digital data bits 140) sent by the transmitter 100. The third estimate of the original traffic digital data bits 140 is even better than the first and second estimates of the original traffic digital data bits 140. Consequently, the enhanced multi stage receiver 801 typically has a better bit error performance than the conventional single maxima receiver 500 or dual maxima receiver 600 or the multi stage receiver 700 shown in FIGS. 2, 4 and 5 respectively.

Figure 9:
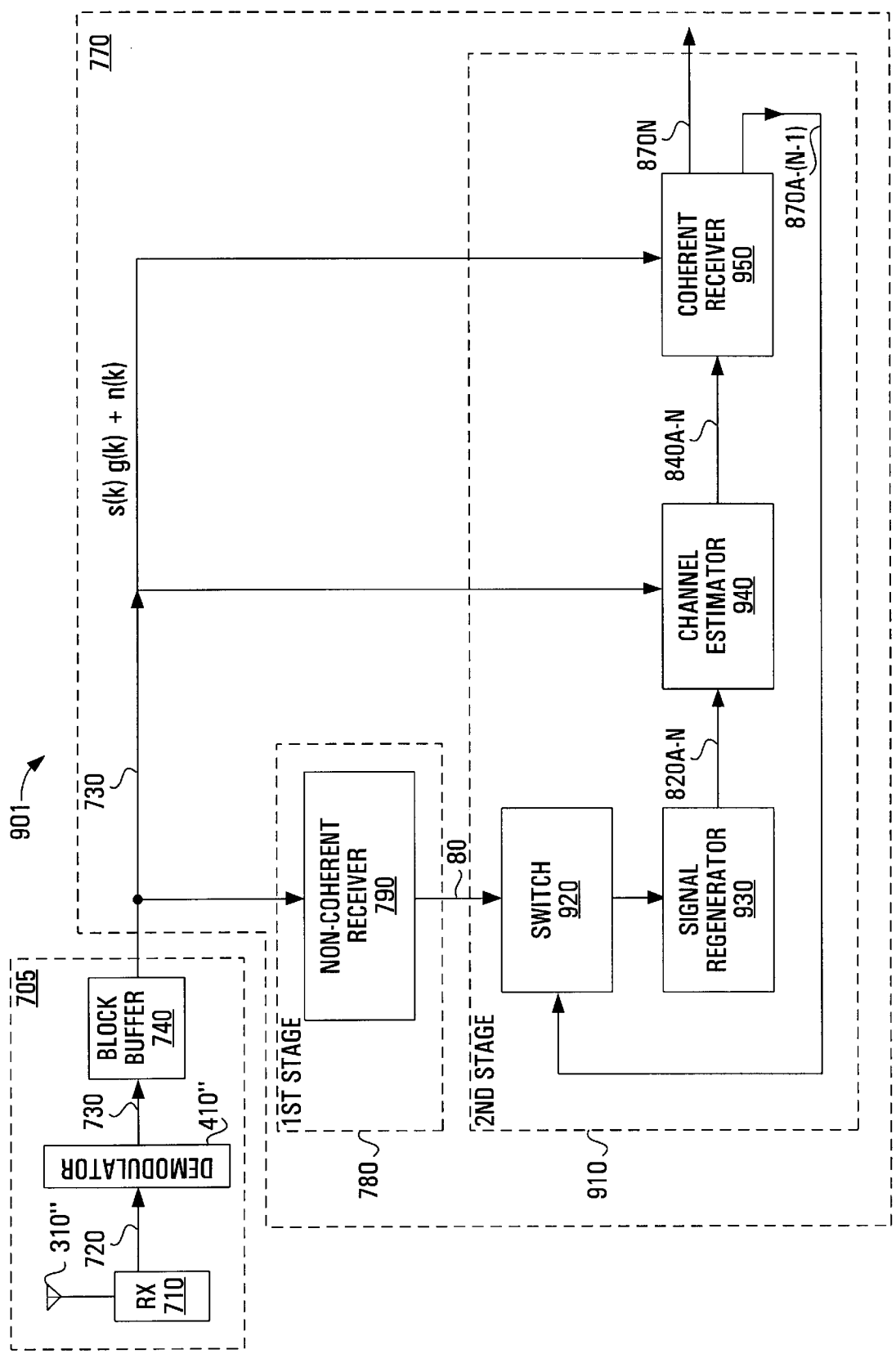
FIG. 9 is a block diagram of an improved multi stage decision feedback receiver in accordance with a third preferred embodiment of the present invention.

By providing a feedback loop, it is possible to eliminate the third stage 900 in the enhanced multi stage receiver 801 and obtain the same or even better bit error performance. In accordance with a third embodiment of the present invention, there is provided a multi stage decision feedback receiver 901 shown in FIG. 9. The multi stage decision feedback receiver 901 has the same receiver and demodulator section 705 used in the multi stage receiver 700 shown in FIG. 5. However, the multi stage decision feedback receiver 901 has a different detector and decoder stage 770. The detector and decoder stage 770 has the same first stage 780 found in the multi stage receiver 700 shown in FIG. 5 but has a different second stage 910. The second stage 910 is similar to the second stage 800 found in the multi stage receiver 700 with the addition of a switch 920 and a feedback loop. Furthermore, the non-coherent receiver 790 in the first stage 780 is no longer directly connected to the signal regenerator 810 as shown in FIG. 5. The non-coherent receiver 790 is connected to the switch 920 as shown in FIG. 9. The switch 920 is connected to a signal regenerator 930. A coherent receiver 950 is also connected to the switch 920 providing the feedback loop. A channel estimator 940 is connected to the signal regenerator 930 and to the coherent receiver 950.

The receiver section 705 and the first stage 780 operate in exactly the same way as previously described for the multi stage receiver 700. That is, for every block of demodulated samples 730, the non-coherent receiver 790 generates (or recovers) 192 traffic data bits 80. (i.e. a frame of traffic data bits 80). The switch 920 allows the traffic data bits 80 to pass through the switch 920 to the signal regenerator 930.

The signal regenerator 930 is identical to the signal regenerator 810 found in the multi stage receiver 700 and operates in exactly the same way. That is the signal regenerator 930 transforms the traffic digital data bits 80 into Walsh codes 820A.

The Walsh codes 820A (i.e. the first estimate of s(k)) are carried from the signal regenerator 930 to the channel estimator 940. In addition, the block of demodulated samples 730 are also carried from the block buffer 740 to the channel estimator 940. Since it takes time for the non-coherent receiver 790 and the signal regenerator 930 to process and transform the block of demodulated samples 730 into the Walsh codes 820A, the channel estimator 940 delays the block of demodulated samples 730 for a first predetermined time to ensure that the Walsh codes 820A are synchronized with the demodulated samples 730. Using conventional techniques known in the art, the channel estimator 940 generates samples 840A, which represent a first estimate of the channel information signal g(k), using the Walsh codes 820A and the demodulated samples 730.

The samples 840A (i.e. representing g(k)) are carried from the channel estimator 940 to the coherent receiver 950. In addition the block of the demodulated samples 730 are carried from the block buffer 740 to the coherent receiver 950. Since it takes time for the non-coherent receiver 790, the signal regenerator 930 and the channel estimator 940 to generate the samples 840A (i.e. g(k)), the coherent receiver 950 block delays the block of received signals 730 for a second predetermine time to ensure that the samples 840A (i.e. g(k)) are synchronized with the demodulated samples 730. The coherent receiver 950 is typically a conventional coherent receiver. The coherent receiver 950 uses the synchronized demodulated samples 730 (i.e. r(k)) and the samples 840A (i.e. g(k)) to generate traffic data bits 870A which represent a second estimate of the original digital traffic (i.e. the original traffic digital data bits 140) sent by the transmitter 100.

However, the traffic data bits 870A are fed back to the switch 920 which prevents any further traffic data bits 80 from passing through the switch 920 but allows the traffic data bits 870A to pass through the switch 920 to the signal regenerator 930. Using the traffic data bits 870A, the signal regenerator 930 then generates Walsh codes 820B (i.e. the second demodulated signal) which are carried to the channel estimator 940. As mentioned earlier, the demodulated samples 730 are. carried from the block buffer 740 to the channel estimator 940. Since it takes time for the first stage 780 and the second stage 910 to generate the traffic data bits 870A and to regenerate the traffic data bits 870A to Walsh codes 820B, the channel estimator 940 block delays the block of the demodulated samples 730 for the third predetermined time to ensure that the demodulated samples 730 are properly synchronized with the Walsh codes 820B. Using the samples 820B and the demodulated samples 730, the channel estimator 940 generates samples 840B which represent a second estimate of the channel information signal g(k).

The samples 840B (i.e. representing g(k)) are carried from the channel estimator 940 to the coherent receiver 950. The demodulated samples 730 are also carried to the coherent receiver 950. Since it takes time for the first stage 780 and the second stage 910 to generate traffic data bits 870A and for the traffic data bits 870A to be transformed into samples 840B, the coherent receiver 950 block delays the block of the received signals 730 for a fourth predetermined time to ensure that the samples 840B are properly synchronized with the demodulated samples 730. Using the samples 840B and the demodulated samples 730, the coherent receiver 950 generates traffic data bits 870B. The traffic data bits 870B represent a third estimate of the original digital traffic (i.e. the original traffic digital data bits 140) sent by the transmitter 100. The third estimate of the original traffic digital data bits 140 is even better than the first and second estimates of the original traffic digital data bits 140.

The traffic data bits 870B may be outputted from the receiver 901 or may be fed back to the switch 920 for another iteration to generate traffic data bits 870C, 870D . . . 870N etc. Typically, the traffic data bits 870N are outputted from the multi stage decision feedback receiver after 3 or 4 iterations. After three or four iterations, the improvements in bit error performance through more iterations are marginal. After the last iteration, the switch 920 allows the next data bits 80 to pass through the switch to the signal regenerator 930.

Other variations of the present invention are possible. For example, in CDMA 2000, it is contemplated that the mobile stations will use transmitters that will send a pilot signal. The pilot signal will provide channel information relating to amplitude changes (i.e. fading) and phase changes) to the receivers at the base station. As a result, the non-coherent receiver 790 in the first stage 780 (as shown in the first, second and third embodiments) is replaced with a coherent receiver. The coherent receiver will transform the demodulated samples 730 into traffic bits 80 using coherent demodulation techniques known in the art.

In addition, the present invention is not limited to CDMA communications systems but may be used with any type of communications system. (e.g. narrow band communications, TDMA, FDMA, etc).

It should be noted that since the preferred embodiments use digital signals, the detector can be implemented using Digital Signal Processing (DSP) techniques.

Another variation of the invention is possible. The demodulator 410" in the receiver section 705 used in the multi stage receiver 700 can be eliminated. The receiver 710 is simply connected to the block buffer 740. The block buffer 740 buffers samples 720 of the processed received signal from the receiver 710. The digital signal comprising the samples 720 may be called a first modulated signal. The first modulated signal may be represented mathematically as follows:

$$r'(k)=s'(k)g'(k)+n'(k)$$

where k is the number of the sample, r'(k) represent the modulated samples 720 of the first modulated signal, s'(k) represent the samples of a sent modulated signal (generated by the transmitter 100), g'(k) represent samples of a second channel information signal and n'(k) represent samples of a second received noise signal. r'(k), s'(k), g'(k) and n'(k) are all complex. The sent modulated signal are the Walsh codes 200 spread by the long and short spreading codes (i.e. the in-phase channel and the corresponding quadrature phase channel spread sequences 220) generated by the transmitter 100. Since the RF signal actually sent by the transmitter 100 may undergo amplitude changes and/or phase changes as the RF signal propagates through the air, g'(k) is used to provide the necessary channel information to reflect these changes. The samples of the second noise signal n'(k) represent. noise introduced as the RF signal propagates through the air from the transmitter 100 to the multi stage receiver.

Once the block buffer 740 is full, the block buffer 740 provides the samples 720 of the processed received signal to a detector stage having a first stage and a second stage. Since samples of a demodulated signal (previously called the first demodulated signal) are not provided to the first stage and to the second stage, the non-coherent receiver in the first stage and the coherent receiver in the second stage are modified and each contain a demodulator which is identical to the demodulator 410" (which was removed from the receiver section 705) and operates in exactly the same way. (Alternatively, if the first stage uses a coherent receiver, the coherent receiver in the first stage also has a demodulator which is identical to the demodulator 410" which was removed from the receiver section 705 and operates in exactly the same way). That is, the demodulators first demodulate the samples 720 of the processed received signal and provide demodulated samples (which are typically identical to the demodulated samples 730 generated by the demodulator 410" in the block detection receiver 700 shown in FIG. 5).

In particular, the modified non-coherent receiver in the first stage is the non-coherent receiver 790 shown in FIG. 6 but modified with a demodulator connected to the Walsh transformer circuitry 420". The demodulator transforms the samples 720 into demodulated samples 730 which are carried to the Walsh Transformer circuitry 420". (The digital signal comprising the demodulated samples 730 may be called a first demodulated signal). The Walsh transformer circuitry 420", the squaring and summing circuitry 430", the soft decision data generator 794, the deinterleaver 550" and the decoder 560" operate as previously described and generate digital data bits 80 (i.e. a frame of traffic data bits 80) which represent a first estimate of the original digital traffic (i.e. the original traffic digital data bits 140) sent by the transmitter 100.

The second stage no longer uses a signal regenerator 810 but uses a signal remodulator. The digital data bits 80 are carried to the signal remodulator from the modified non-coherent receiver. The signal remodulator is the same as the signal regenerator 810 shown in FIG. 7 but also has a modulator connected to the mapper 190'. In the same way as previously described for the signal regenerator, the signal remodulator generates Walsh codes 820A. The Walsh codes 820A are carried to the modulator. The modulator is identical to the modulator 210 used by the transmitter 100. The modulator first spreads each Walsh code 820A with the long binary PN code used by the transmitter 100 in order to generate PN sequences. The modulator then spreads the PN sequences with the pair of short spreading codes (used by the modulator 210) to generate in-phase channel and quadrature phase channel spread sequences. The in-phase channel and the quadrature phase channel spread sequences may be represented as one digital signal using complex mathematics. This digital signal may be called a second modulated signal.

The first modulated signal and the second modulated signal are carried to a modified channel estimator which is similar to the channel estimator 930 shown in FIG. 5. Since it takes time for the modified non-coherent receiver (with a demodulator) and the signal remodulator to generate the second modulated signal, the modified channel estimator block delays the first modulated signal for a first predetermined time to ensure that the first modulated signal and the second modulated signal are synchronized. The modified channel estimator then generates channel estimation samples using the first modulated signal and the second modulated signal. The channel estimation samples represent a first estimate of the second channel information signal g'(k). The channel estimation samples and the first modulated signal are carried to the modified coherent receiver in the second stage.

As mentioned earlier, the modified coherent receiver has a demodulator which demodulates and transforms the samples 720 (of the first modulated signal) into demodulated samples. The digital signal comprising these demodulated samples may be called a second demodulated signal. Since it takes time for the first stage, the signal remodulator and the modified channel estimator to generate the channel estimation samples, the modified coherent receiver block delays the first modulated signal (or the second demodulated signal) for a second predetermined time to ensure that the second demodulated signal is synchronized with the channel estimation samples. Using the demodulated samples from the second demodulated signal and the channel estimation samples, the modified coherent receiver generates traffic data bits which represent a second estimate of the original digital traffic (i.e. the original traffic digital data bits 140) sent by the transmitter 100.

The traffic data bits which represent the second estimate of the original digital traffic may be output from the receiver or may be inputted to another stage (i.e. a third stage). The third stage is similar to the second stage and operates in a similar way. That is, the third stage consists a second signal remodulator, a second modified channel estimator and a second modified coherent receiver which are essentially identical to the signal remodulator, the modified channel estimator and the modified coherent receiver in the second stage. The second modified channel estimator is connected to the second signal remodulator and the second modified coherent receiver. The third stage is connected to the second stage and to the block buffer 740. In particular, the coherent receiver is connected to the second signal remodulator. The block buffer 740 is connected to the second modified channel estimator and to the second modified coherent receiver.

The traffic data bits which represent the second estimate of the original digital traffic are inputted into the second signal remodulator. The second signal remodulator is identical to the signal remodulator in the second stage and operates in exactly the same way. That is, the second signal remodulator generates a third modulated signal from the traffic data bits from the coherent receiver in the second stage. The third modulated signal and the first modulated signal are carried to the second modified channel estimator which operates in a similar way to the modified channel estimator in the second stage. Since it takes time for the modified non-coherent receiver (with a demodulator) and the second stage and the second signal remodulator to generate the third modulated signal, the second modified channel estimator block delays the first modulated signal for a third predetermined time to ensure that the first modulated signal and the third modulated signal are synchronized. The second modified channel estimator then generates second channel estimation samples using the first modulated signal and the third modulated signal. The second channel estimation samples represent a second estimate of the second channel information signal g'(k). The second channel estimation samples and the first modulated signal are carried to the second modified coherent receiver in the third stage.

The second modified coherent receiver has a demodulator which demodulates and transforms the samples 720 (of the first modulated signal) into demodulated samples. Since it takes time for the first stage, the second stage, the second signal remodulator and the second modified channel estimator to generate the second channel estimation samples, the second modified coherent receiver block delays the first modulated signal (or the associated demodulated samples) for a fourth predetermined time to ensure that the demodulated samples are synchronized with the second channel estimation samples. Using the demodulated samples and the second channel estimation samples, the second modified coherent receiver generates traffic data bits which represent a third estimate of the original digital traffic (i.e. the original traffic digital data bits 140) sent by the transmitter 100.

The traffic data bits which represent the third estimate of the original digital traffic may be output from the receiver or may be inputted to another stage (i.e. a fourth stage).

Alternatively, the third stage (and any additional stages) may be eliminated by providing a switch in the second stage and a feedback loop. The non-coherent receiver in the first stage is no longer connected to the signal remodulator in the second stage. The switch is connected too the non-coherent receiver in the first stage and to the signal remodulator. The coherent receiver in the third stage is connected to the switch providing a feedback loop. The switch and the feedback loop are identical to the switch 910 and the feedback loop used by the multi stage receiver 901 shown in FIG. 9 and operate in exactly the same way. That is, the multi stage receiver with the switch and the feedback loop provide digital traffic bits which represent a first, a second, a third, etc estimates of the original traffic digital data bits 140 sent by the transmitter 100.

Alternatively, once the block buffer 740 is full, the block buffer 740 provides the samples 720 of the processed received signal to a detector stage having a demodulator, a first stage and a second stage. The demodulator is identical to the demodulator 410" (which was removed from the receiver section 705) and operates in exactly the same way. That is, the demodulator demodulates the samples 720 from the block buffer 740 into a first demodulated signal comprising demodulated samples. The first demodulated signal is then provided to the first stage and the second stage. The first stage and the second stage are identical to the first stage 780 and the second stage 800 in the multi stage receiver 700 and operate in exactly the same way.

The traffic data bits from the second stage (which represent a second estimate of the original digital traffic 140) may be output from the receiver or may be inputted to another stage (e.g. a third stage) which generates more traffic data bits (which represent a third estimate of the original digital traffic 140) sent by the transmitter 100.

Alternatively, the third stage (and any additional stages) may be eliminated by providing a switch in the second stage and a feedback loop. The non-coherent receiver in the first stage is no longer connected to the signal remodulator in the second stage. The switch is connected too the non-coherent receiver in the first stage and to the signal remodulator. The coherent receiver in the third stage is connected to the switch providing a feedback loop. The switch and the feedback loop are identical to the switch 910 and the feedback loop used by the multi stage receiver 901 shown in FIG. 9 and operate in exactly the same way. That is, the multi stage receiver with the switch and the feedback loop provide digital traffic bits which represent a first, a second, a third, etc estimates of the original traffic digital data bits 140 sent by the transmitter 100.

We claim:

1. A detector for detecting a traffic signal from a first demodulated signal supplied by a receiver section, said detector comprising:
   a first stage for receiving the first demodulated signal and generating a first estimate of the traffic signal from the first demodulated signal; and,
   a second stage connected to the first stage, said second stage for receiving the first demodulated signal and the first estimate of the traffic signal and generating a second estimate of the traffic signal from the first demodulated signal and the first estimate of the traffic signal.

2. A detector according to claim 1 wherein the second stage buffers and delays the first demodulated signal to ensure proper synchronization of the first estimate of the traffic signal with the first demodulated signal.

3. A detector according to claim 1 wherein the first stage is a non-coherent receiver.

4. A detector according to claim 3 wherein the second stage comprises:
   a signal regenerator connected to the first stage, said signal regenerator for regenerating the first estimate of the traffic signal from the first stage into a second demodulated signal;
   a channel estimator connected to the signal regenerator, said channel estimator for generating a channel information signal from the second demodulated signal and the first demodulated signal;
   a coherent receiver connected to the channel estimator for coherently receiving the first demodulated signal and generating the second estimate of the traffic signal using the first demodulated signal and the channel information signal.

5. A detector according to claim 4 wherein the channel estimator buffers and delays the first demodulated signal for a first predetermined time to ensure proper synchronization of the second demodulated signal with the first demodulated signal and wherein the coherent receiver buffers and delays the first demodulated signal for a second predetermined time to ensure proper synchronization of the channel information signal with the first demodulated signal.

6. A detector according to claim 1 wherein the first stage is a coherent receiver.

7. A detector according to claim 6 wherein the second stage comprises:
   a signal regenerator connected to the first stage, said signal regenerator for regenerating the first estimate of the traffic signal from the first stage into a second demodulated signal;
   a channel estimator connected to the signal regenerator, said channel estimator for generating a channel information signal from the second demodulated signal and the first demodulated signal;
   a coherent receiver connected to the channel estimator for coherently receiving the first demodulated signal and generating the second estimate of the traffic signal using the first demodulated signal and the channel information signal.

8. A detector according to claim 7 wherein the channel estimator buffers and delays the first demodulated signal for a first predetermined time to ensure proper synchronization of the second demodulated signal with the first demodulated signal and wherein the coherent receiver buffers and delays the first demodulated signal for a second predetermined time to ensure proper synchronization of the channel information signal with the first demodulated signal.

9. A detector according to claim 1 further comprising a third stage connected to the second stage, said third stage for receiving the first demodulated signal and the second estimate of the traffic signal and generating a third estimate of the traffic signal using the first demodulated signal and the second estimate of the traffic signal from the second stage.

10. A detector according to claim 9 wherein the third stage buffers and delays the first demodulated signal to ensure proper synchronization of the second estimate of the traffic signal from the second stage with the first demodulated signal.

11. A detector according to claim 9 wherein the first stage is a non-coherent receiver.

12. A detector according to claim 11 wherein the second stage comprises:
   a signal regenerator connected to the first stage, said signal regenerator for regenerating the first estimate of the traffic signal from the first stage into a second demodulated signal;
   a channel estimator connected to the signal regenerator, said channel estimator for generating a channel information signal from the second demodulated signal and the first demodulated signal;
   a coherent receiver connected to the channel estimator for coherently receiving the first demodulated signal and generating the second estimate of the traffic signal using the first demodulated signal and the channel information signal.

13. A detector according to claim 12 wherein the third stage comprises:
   a second signal regenerator connected to the second stage, said second signal regenerator for regenerating the second estimate of the traffic signal from the second stage into a third demodulated signal;

a second channel estimator connected to the second signal regenerator, said second channel estimator for generating a second channel information signal from the third demodulated signal and the first demodulated signal;

a second coherent receiver connected to the second channel estimator for coherently receiving the first demodulated signal and generating a third estimate of the traffic signal using the first demodulated signal and the second channel information signal.

14. A detector according to claim 13 wherein the channel estimator buffers and delays the first demodulated signal for a first predetermined time to ensure proper synchronization of the second demodulated signal with the first demodulated signal; wherein the coherent receiver buffers and delays the first demodulated signal for a second predetermined time to ensure proper synchronization of the channel information signal with the first demodulated signal; wherein the second channel estimator buffers and delays the first demodulated signal for a third predetermined time to ensure proper synchronization of the third demodulated signal with the first demodulated signal; and wherein the second coherent receiver buffers and delays the first demodulated signal for a fourth predetermined time to ensure proper synchronization of the second channel information signal with the first demodulated signal.

15. A detector according to claim 9 wherein the first stage is a coherent receiver.

16. A detector according to claim 15 wherein the second stage comprises:

a signal regenerator connected to the first stage, said signal regenerator for regenerating the first estimate of the traffic signal from the first stage into a second demodulated signal;

a channel estimator connected to the signal regenerator, said channel estimator for generating a channel information signal from the second demodulated signal and the first demodulated signal;

a coherent receiver connected to the channel estimator for coherently receiving the first demodulated signal and generating the second estimate of the traffic signal using the first demodulated signal and the channel information signal.

17. A detector according to claim 16 wherein the third stage comprises:

a second signal regenerator connected to the second stage, said second signal regenerator for regenerating the second estimate of the traffic signal from the second stage into a third demodulated signal;

a second channel estimator connected to the second signal regenerator, said second channel estimator for generating a second channel information signal from the third demodulated signal and the first demodulated signal;

a second coherent receiver connected to the second channel estimator for coherently receiving the first demodulated signal and generating a third estimate of the traffic signal using the first demodulated signal and the second channel information signal.

18. A detector according to claim 17 the channel estimator buffers and delays the first demodulated signal for a first predetermined time to ensure proper synchronization of the second demodulated signal with the first demodulated signal; wherein the coherent receiver buffers and delays the first demodulated signal for a second predetermined time to ensure proper synchronization of the channel information signal with the first demodulated signal; wherein the second channel estimator buffers and delays the first demodulated signal for a third predetermined time to ensure proper synchronization of the third demodulated signal with the first demodulated signal; and wherein the second coherent receiver buffers and delays the first demodulated signal for a fourth predetermined time to ensure proper synchronization of the second channel information signal with the first demodulated signal.

19. A detector according to claim 1 wherein said second stage comprises an input and an output and feedback means and wherein the feedback means permit the second estimate of the traffic signal from the output to be feed back into the input in order to generate a third estimate of the traffic signal.

20. A detector according to claim 19 wherein the feedback means also permit the third estimate of the traffic signal from the output to be feed back into the input in order to generate a fourth estimate of the traffic signal.

21. A detector according to claim 1 wherein said second stage comprises an input and an output and feedback means wherein the feedback means permit each estimate of the traffic signal from the output to be feed back into the input in order to generate another estimate of the traffic signal.

22. A method of detecting a traffic signal from a first demodulated signal supplied by a receiver section, said method comprising the steps of:

(a) generating an estimate of the traffic signal from the first demodulated signal using a first stage; and, (b) generating another estimate of the traffic signal from the first demodulated signal and the estimate of the traffic signal obtained from step (a) using a second stage.

23. A method according to claim 22 further comprising the steps of:

(c) feeding back the estimate of the traffic signal obtained from step (b) into the second stage;

(d) generating another estimate of the traffic signal from the first demodulated signal and the estimate of the traffic signal obtained from step (b) using the second stage.

24. A method according to claim 23 further comprising repeating steps (c) and (d) for a predetermined number of times in order to generate further estimates of the traffic signal.

25. A method of detecting a traffic signal from a first demodulated signal supplied by a receiver section, said method comprising the steps of:

(a) generating an estimate of the traffic signal from the first demodulated signal;

(b) generating another demodulated signal from the estimate of the traffic signal obtained from step (a);

(c) generating a channel information signal from the demodulated signal obtained from step (b) and the first demodulated signal; and (d) generating another estimate of the traffic signal using the first demodulated signal and the channel information signal obtained from step (c).

26. A method according to claim 25 further comprising the steps of:

(e) generating another demodulated signal from the estimate of the traffic signal obtained from step (d);

(f) generating another channel information signal from the demodulated signal obtained from step (e) and the first demodulated signal; and (g) generating another estimate of the traffic signal using the first demodulated signal and the channel information signal obtained from step (f).

27. A method according to claim 26 further comprising repeating steps (e), (f) and (g) for a predetermined number of times in order to generate further estimates of the traffic signal.

28. A detector for detecting a traffic signal from a first modulated signal supplied by a receiver section, said detector comprising:

a first stage for receiving the first modulated signal and generating a first estimate of the traffic signal from the first modulated signal; and, a second stage connected to the first stage, said second stage for receiving the first modulated signal and the first estimate of the traffic signal and generating a second estimate of the traffic signal from the first modulated signal and the first estimate of the traffic signal.

29. A detector according to claim 28 wherein the second stage buffers and delays the first modulated signal to ensure proper synchronization of the first estimate of the traffic signal with the first modulated signal.

30. A detector according to claim 28 wherein the first stage is a non-coherent receiver having a demodulator for demodulating the first modulated signal into a first demodulated signal and wherein the non-coherent receiver generates the first estimate of the traffic signal using the first demodulated signal.

31. A detector according to claim 30 wherein the second stage comprises:

a signal remodulator connected to the first stage, said signal remodulator for remodulating the first estimate of the traffic signal from the first stage into a second modulated signal;

a channel estimator connected to the signal remodulator, said channel estimator for generating a channel information signal from the second modulated signal and the first modulated signal;

a coherent receiver connected to the channel estimator, said coherent receiver having a demodulator for demodulating the first modulated signal into a second demodulated signal and wherein the coherent receiver generates the second estimate of the traffic signal using the second demodulated signal and the channel information signal.

32. A detector according to claim 31 wherein the channel estimator buffers and delays the first modulated signal for a first predetermined time to ensure proper synchronization of the second modulated signal with the first modulated signal and wherein the coherent receiver buffers and delays the first modulated signal for a second predetermined time to ensure proper synchronization of the channel information signal with the second demodulated signal.

33. A detector according to claim 28 wherein the first stage is a coherent receiver having a demodulator.

34. A detector according to claim 28 further comprising a third stage connected to the second stage, said third stage for receiving the first modulated signal and the second estimate of the traffic signal and generating a third estimate of the traffic signal using the first modulated signal and the second estimate of the traffic signal from the second stage.

35. A detector according to claim 34 wherein the third stage buffers and delays the first modulated signal to ensure proper synchronization of the second estimate of the traffic signal from the second stage with the first modulated signal.

36. A detector according to claim 28 wherein said second stage comprises an input and an output and feedback means wherein the feedback means permit each estimate of the traffic signal from the output to be feed back into the input in order to generate another estimate of the traffic signal.

37. A method of detecting a traffic signal from a first modulated signal supplied by a receiver section, said method comprising the steps of:

(a) generating an estimate of the traffic signal from the first modulated signal using a first stage; and, (b) generating another estimate of the traffic signal from the first modulated signal and the estimate of the traffic signal obtained from step (a) using a second stage.

38. A method according to claim 37 further comprising the steps of:

(c) feeding back the estimate of the traffic signal obtained from step (b) into the second stage;

(d) generating another estimate of the traffic signal from the first modulated signal and the estimate of the traffic signal obtained from step (b) using the second stage.

39. A method according to claim 38 further comprising repeating steps (c) and (d) for a predetermined number of times in order to generate further estimates of the traffic signal.

40. A method of detecting a traffic signal from a first modulated signal supplied by a receiver section, said method comprising the steps of:

(a) demodulating the first modulated signal into a first demodulated signal;

(b) generating an estimate of the traffic signal from the first demodulated signal;

(c) generating another modulated signal from the estimate of the traffic signal obtained from step (b);

(d) generating a channel information signal from the modulated signal obtained from step (c) and the first modulated signal; and, (e) generating another estimate of the traffic signal using the first demodulated signal and the channel information signal obtained from step (d).

41. A method according to claim 40 further comprising the steps of:

(f) generating another modulated signal from the estimate of the traffic signal obtained from step (e);

(g) generating another channel information signal from the modulated signal obtained from step (f) and the first modulated signal; and (h) generating another estimate of the traffic signal using the first demodulated signal and the channel information signal obtained from step (g).

42. A method according to claim 41 further comprising repeating steps (f), (g) and (h) for a predetermined number of times in order to generate further estimates of the traffic signal.

* * * * *